United States Patent [19]

Brookhyser

[11] 4,188,733

[45] Feb. 19, 1980

[54] APPARATUS FOR INDEXING A ROTARY FRAME

[75] Inventor: Byron B. Brookhyser, Milton, Wash.

[73] Assignee: Weyerhaeuser Company, Tacoma, Wash.

[21] Appl. No.: 888,439

[22] Filed: Mar. 20, 1978

[51] Int. Cl.² ............................................. F26B 25/00
[52] U.S. Cl. ..................................... 34/236; 34/144; 198/378; 198/858
[58] Field of Search ..................... 34/144, 145, 236; 198/378, 858, 859

[56] References Cited

U.S. PATENT DOCUMENTS 2,678,719  5/1954  Davis .................... 198/859

Primary Examiner—John J. Camby

[57] ABSTRACT

A heated metal plate drying system for drying either green veneer or partially dried veneer can have a plurality of modular hot presses mounted on a frame. At a loading station, individual sheets of veneer to be dried or redried are fed into a hot press, and at an unloading station the dried veneer sheets are unloaded from the system. Within each individual modular hot press, a direct contact drying process occurs that functions to reduce the moisture content of a veneer sheet down to the desired uniform level such as within a range of from 1 to 10%. The drying process accepts veneer of different species, thickness, and beginning moisture contents and the controlled process variables include contact time, temperature and pressure.

Each individual modular press can be multi-opening and has the ability to open and close on command. Specially designed heated metal plates are part of each press and each plate has substantially parallel grooves on at least one surface. The modular presses are mounted on the frame such that they may be tilted at the unloading station to facilitate unloading of the dried veneer sheets. At the loading station, a loading apparatus functions to sequentially feed individual veneer sheets into the openings. The loading apparatus is pivotally mounted. Also provided is an aligning apparatus for ensuring proper alignment of each veneer sheet within its respective opening after being loaded. The modular presses in one embodiment are mounted on a carousel frame structure that is rotatable on a main bearing so each modular press indexes past the loading and unloading stations.

3 Claims, 20 Drawing Figures

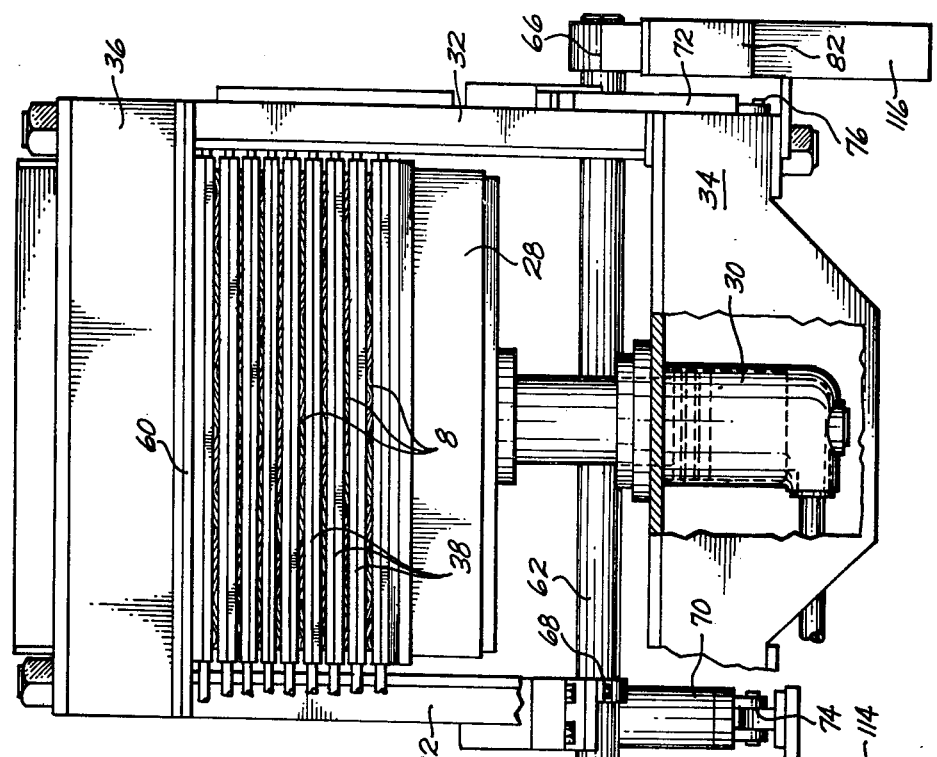
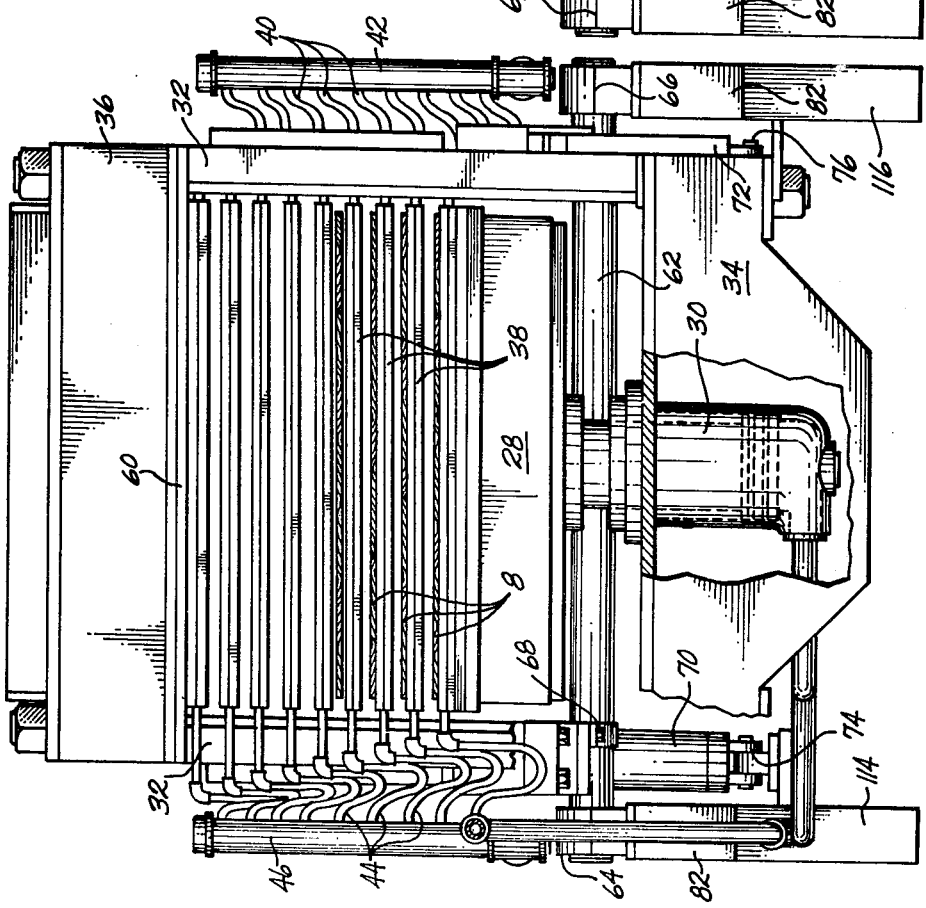

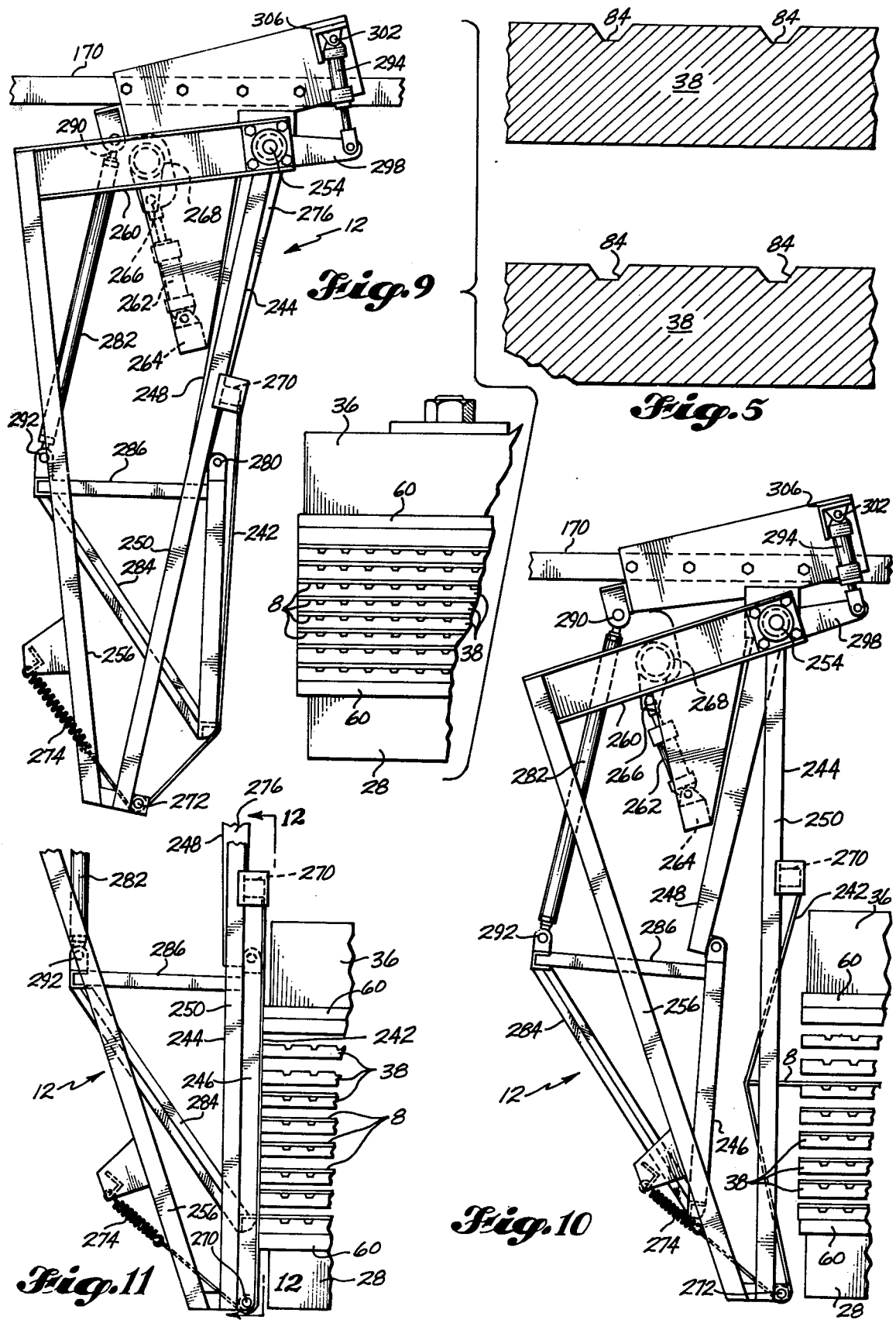

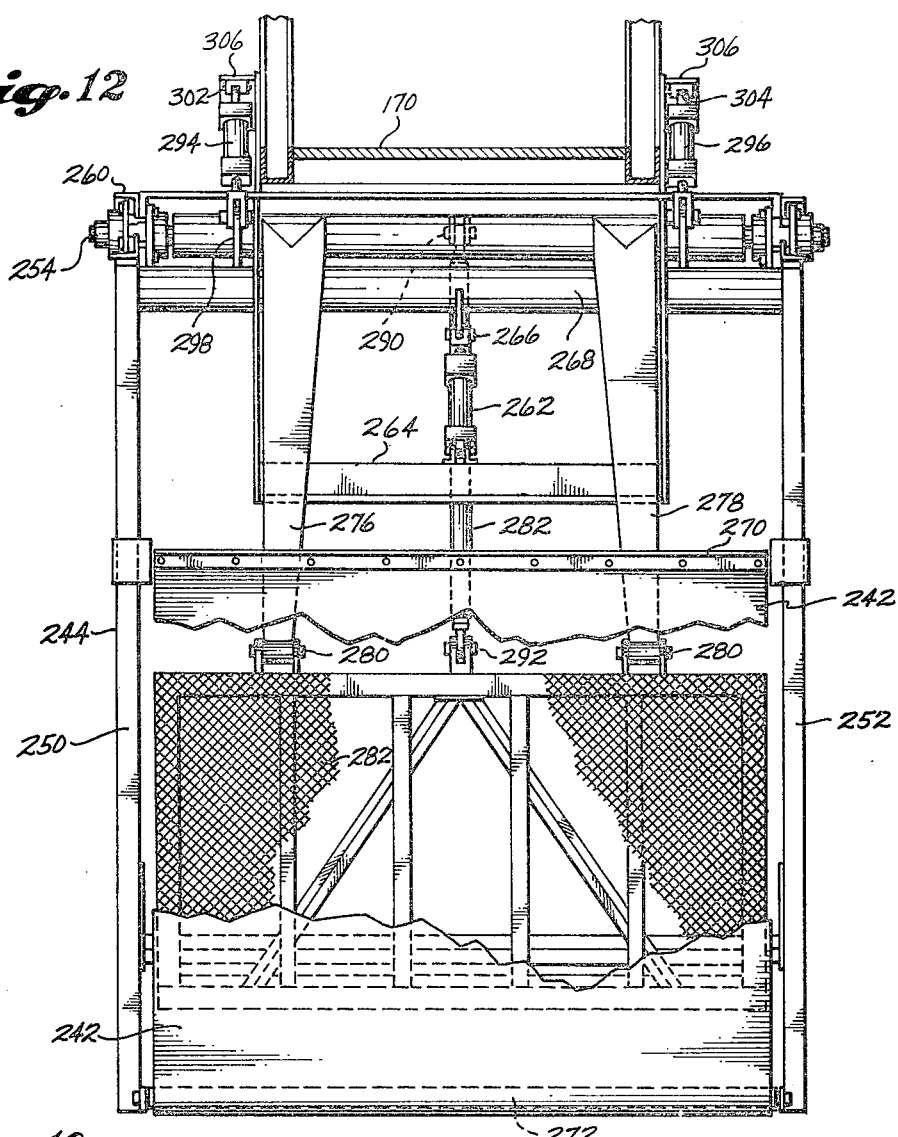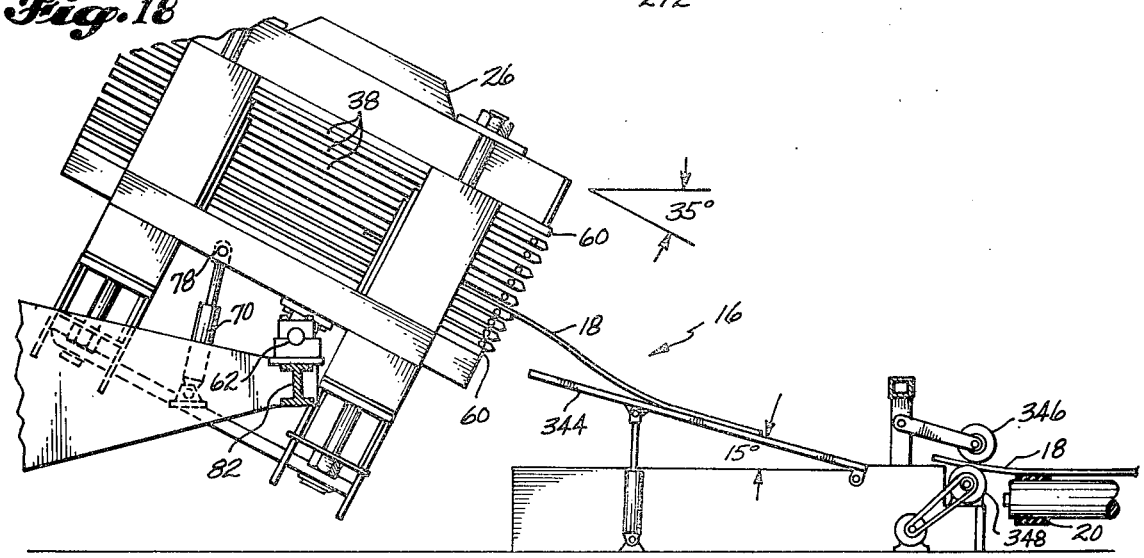

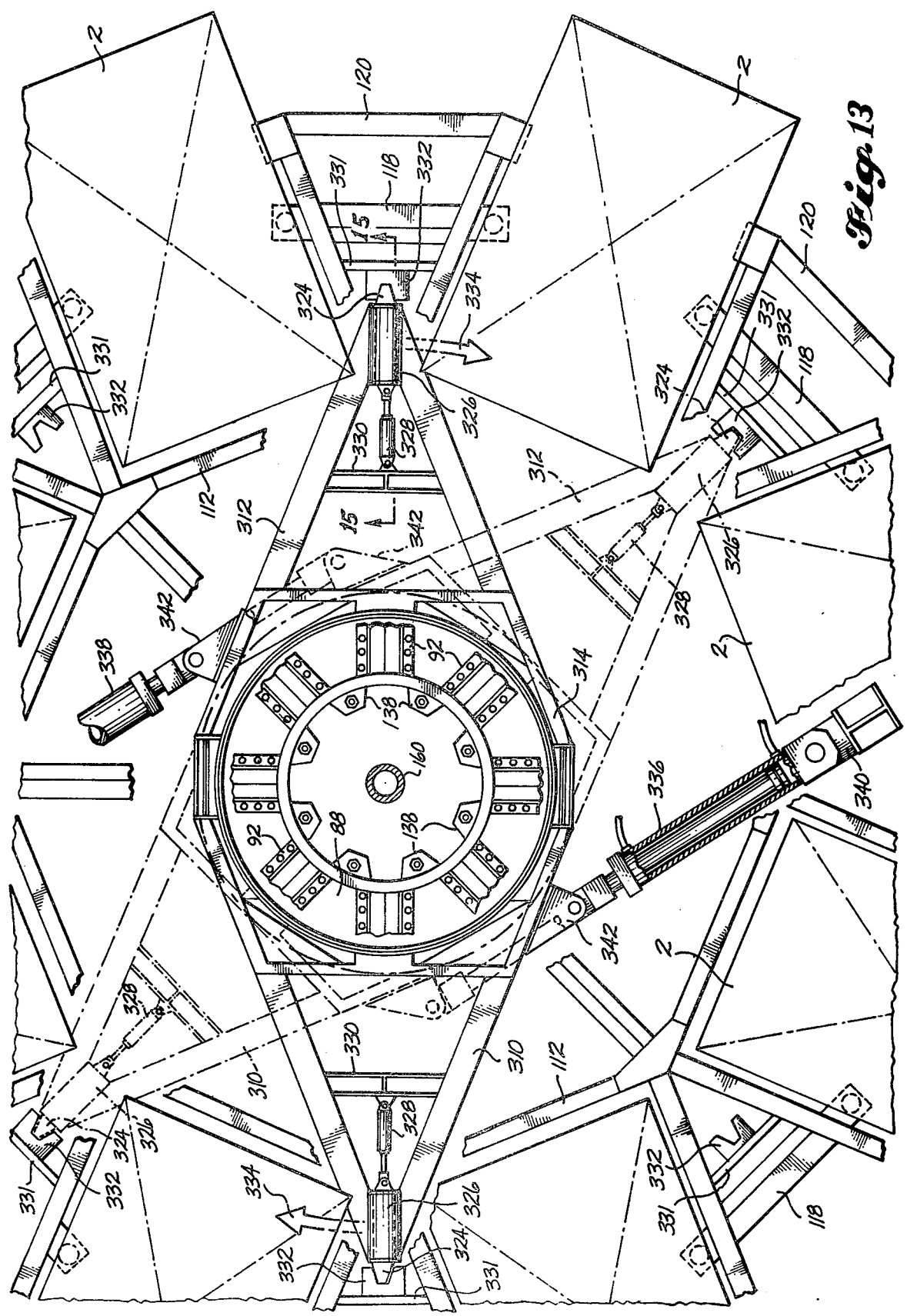

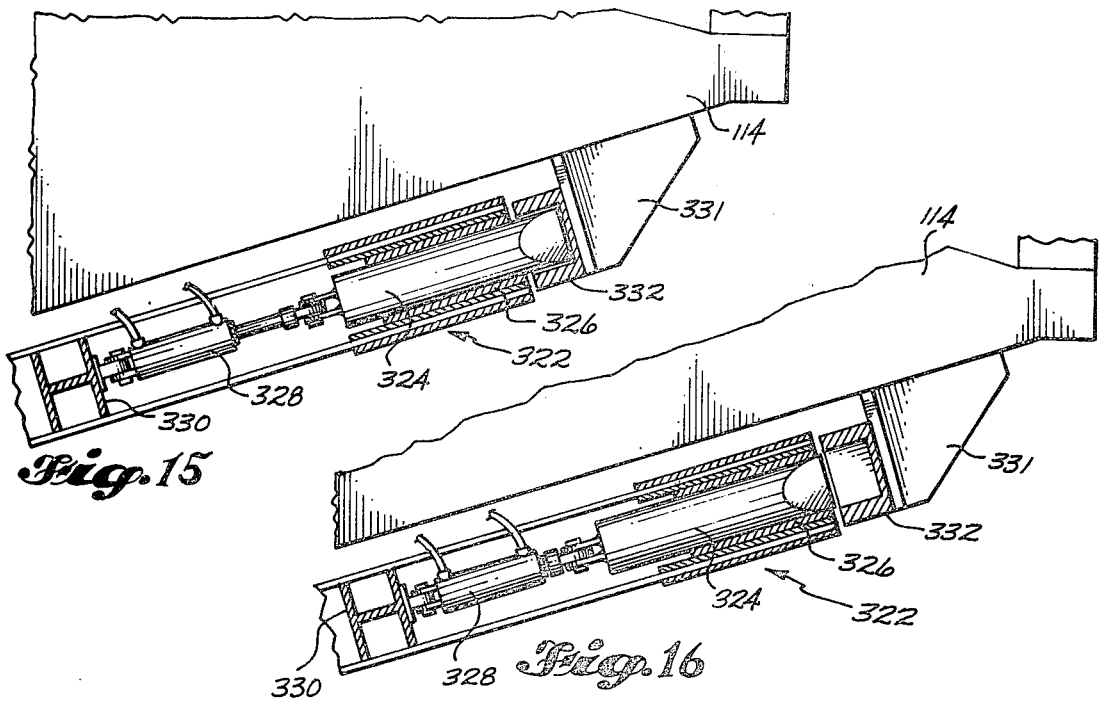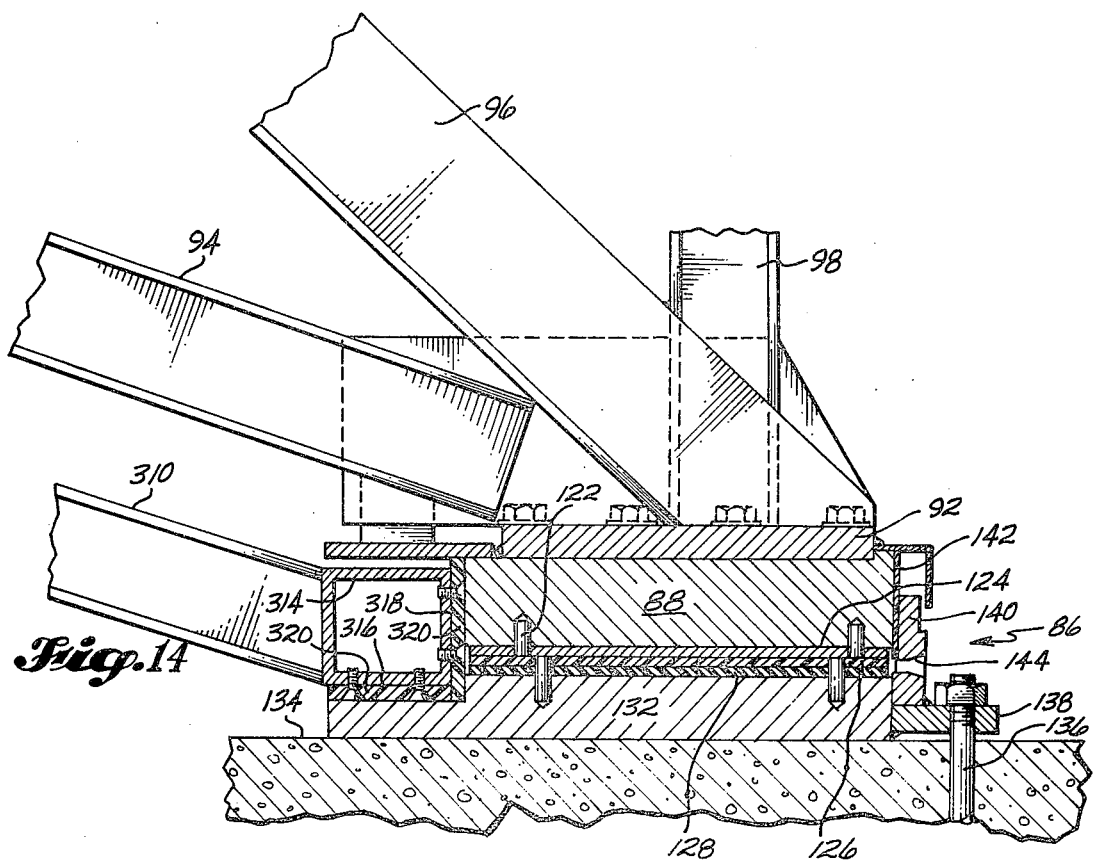

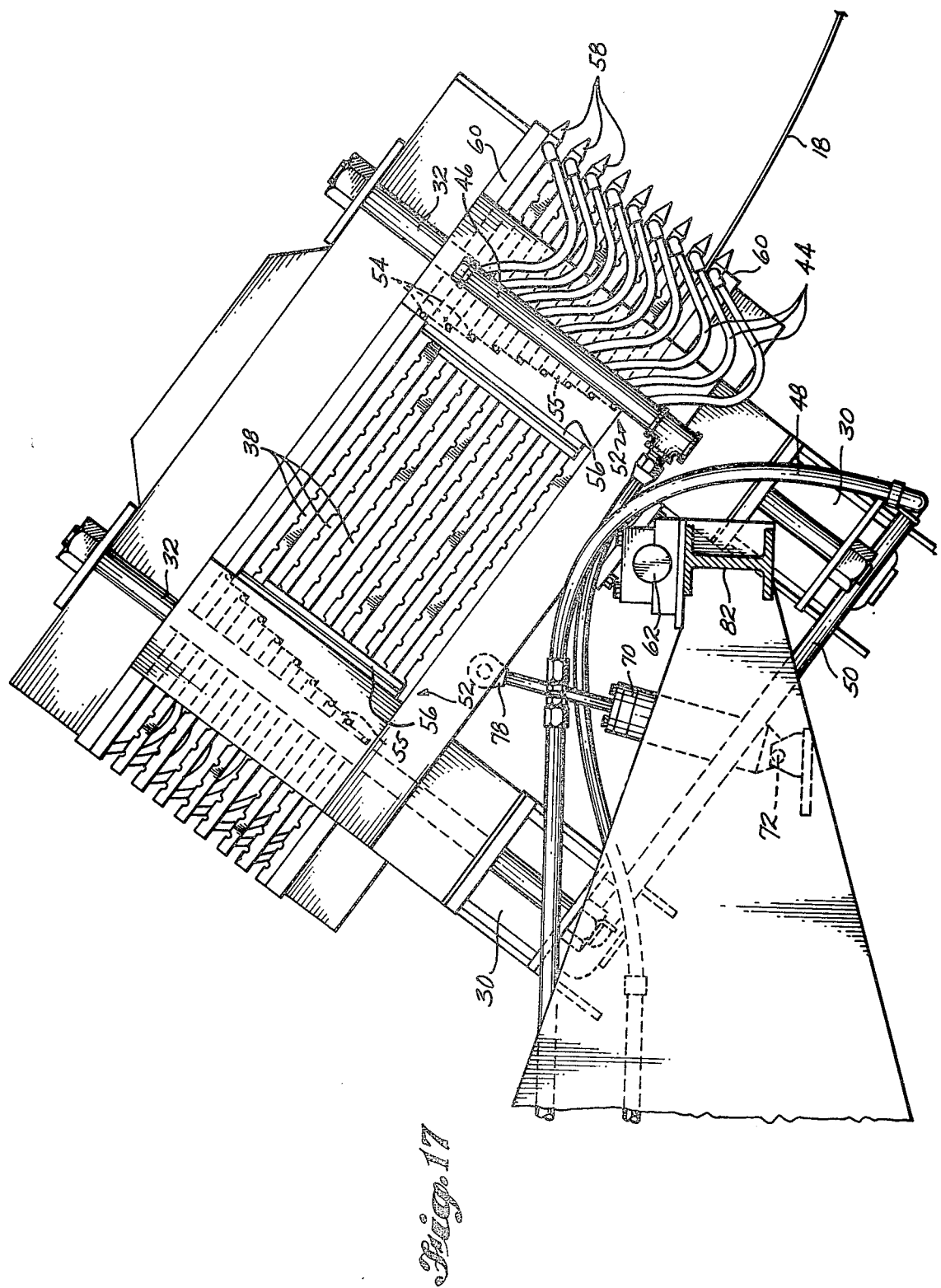

APPARATUS FOR INDEXING A ROTARY FRAME

BACKGROUND OF THE INVENTION

The field is veneer drying and handling. More particularly, the inventive subject matter relates to a contact drying process for veneer and several material handling devices.

In the manufacture of plywood panels, dried veneer sheets are utilized. The veneer sheets are peeled from a log and then clipped to size before being dried to a predetermined moisture content suitable for adhesive bonding. The desirable dry veneer characteristics for adhesive application and manufacture into plywood are: a moisture content that is uniform and consistently within a predetermined narrow range; the veneer should have smooth surfaces for adhesive application and material handling; the surfaces of the dry veneer should be free from extractives and residues; the veneer sheets should be dimensionally stable; and the veneer sheets should have a uniform thickness.

Conventional veneer drying systems presently used in plywood or veneer manufacturing plants are typically long continuous hot-air dryers. The wet veneer sheets, having a green moisture content of anywhere from 30 to 250%, are conveyed longitudinally through a hot-air dryer. Hot air impinges upon the surface of the veneer as it passes through the dryer, transferring heat to the veneer sheet thereby drying the veneer and generally reducing its moisture content to a desired range of from 0-10% for softwoods and from 5-20% for hardwoods.

Owing to the variability of the moisture content of incoming wet veneer, thermal stresses, and resulting shrinkage that occurs during the typical drying process, many of the above-mentioned desirable characteristics are not consistently obtained. For example, conventionally dried veneer usually has a range of moisture contents within the resulting dried veneer and a certain percentage of veneer that passes through the dryer must be redried in order to reduce the moisture content to the finally desired level. In addition, certain areas within a sheet of veneer are susceptible to over-drying, which also is undesirable in that in the over-dried areas, that is bone dry, additional adhesive is required to result in good adhesive bonding. Typically, the veneer that exits from a conventional dryer is oftentimes wavy since it is unrestrained during drying and, therefore, presents material handling problems which can result in additional wood losses subsequently in the plywood manufacturing process. Typically, shrinkage in the veneer will occur in the tangential direction, that is tangential to the annual rings of the log which is on the order of from 5 to 10% of the initial veneer dimensions. Of course, it will be appreciated by those skilled in the art that if this loss could be reduced, then the typical first clipped size could be reduced, thereby conserving valuable wood.

Additional wood loss occurs in conventional drying processes due to the nonuniform composition of conventionally dried veneer. If there is a great deal of redrying that must be done due to nonuniform drying, then typical losses during the redrying process can be on the order of from 3 to 8% of veneer primarily due to its material handling losses. Additionally, it has been determined that further processing damage can result in an additional 3 to 7% wood loss from such areas as binding in the adhesive spreaders, uneven edges catching in various downstream mechanical processes, and the like.

Not only is there a great deal of wood loss within conventional drying processes but there is also the inherent problem stemming from the nonuniform drying characteristics due to the use of impinging hot air on unrestrained veneer. This results primarily from the nonuniform drying rates within the wood itself due to its initial nonuniform moisture content. This results in quantities of veneer exiting a veneer dryer being both overdried and underdried, which in turn results in redrying with its losses, other downstream problems such as "blows" and gluing problems stemming from "dryout" and "undercure". Dryout is that condition where the veneer is bone dry and, among other problems, allows the adhesive to penetrate the veneer more than desirable and during pressing of the plywood panels, the adhesive will not bond properly. Undercure is that condition where inadequate adhesive penetration occurs at the surface of the veneer and, consequently, adhesive requires a longer time within the panel press to cure. Blows are most severe and result where underdried wet veneer is placed in a hot press and excessive vapor is created under pressure causing separation or delamination of the plies. Of course, these typical causes of delamination are well known to those skilled in the art and are known to be caused by the nonuniform moisture contents within the conventionally dried veneers. The most optimum moisture content range in a sheet of dried veneer is typically from 1 to 5% and preferably the content will be substantially uniform within the range. By having a uniform, narrow range, adhesive penetration into the surface of the dried veneer is also uniform and then, when the laid-up plies are pressed into the panel, uniform curing of the adhesive will occur. As previously mentioned, however, such a uniform moisture content within a narrow range is nearly impossible in conventional veneer drying processes due to the substantial variability in initial moisture content within the green veneer sheets. In some veneer the moisture content may range from 30 to 150% within the same sheet. Such sheets may be comprised in part of heartwood and in part of sapwood, thereby causing the wide variation.

With existing conventional dryers and redryers, a substantial amount of energy is required per unit of dried veneer and in terms of steam usage, a typical range would be from 2,100 to 3,000 pounds of steam per hour per 1,000 square feet of dried veneer. Electrical energy requirements may vary typically from 520 to 1,500 hp. Of course, it will be recognized that, with today's high energy costs, these energy requirements represent a significant cost element in drying veneer. In addition, with the typical 10 to 30% redry rate, an additional amount of energy is required. A significant amount of the energy going into the drying system is wasted in that the heat transfer characteristics of impinging hot air onto veneer sheets is extremely inefficient, and thus a significant amount of energy is required to reduce the moisture content to acceptable levels. As the thickness of the veneer to be dried increases, as well as the average initial moisture content, even greater amounts of energy are required per unit of dried veneer to achieve the desired final moisture content. Of course, it is well known that within existing commercially available veneer dryers, the veneer which is thick and has a high moisture content is left in the dryer for a longer time, simply by reducing the speed with which it travels through the dryer. As pointed out above, as the hot air impinges on the veneer for longer time periods, the quantity of overdried veneer increases.

It is also a recognized problem that with conventional dryers the traveling veneer, usually supported on wire cables or rollers has a tendency to catch on internal parts causing machine stoppages requiring an operator to physically open the dryer and remove the accumulation of veneer. This results in a loss of valuable veneer in addition to slowing down the dryer line and causing other problems. This is, in part, caused by the severe strains producing waviness due to the high temperatures within the dryer. Additionally, if veneer sheets are allowed to remain stationary within the dryer, they can get so hot that ignition can occur causing fires which, of course, represent a safety hazard to persons and property. These just-mentioned operating problems are inherent in most conventional veneer dryers and are dealt with simply by expending the cost to solve the problem when it arises.

Another aspect of conventional veneer drying is the reduced capacity of the primary dryer caused by a requirement to redry 10 to 30% of the veneer. Redrying takes the capacity of the primary dryer to accommodate the time for redrying the partially dried veneer.

Yet a further problem with conventional veneer dryers, one that is of increasing importance, is the emission of so-called "blue haze." Blue haze is essentially a vapor containing particulate matter that is generated from the drying process consisting in part of hydrocarbons in particulate form. Most conventional dryers that merely exhaust their vapors into the atmosphere without treatment do not meet minimum environmental standards now required in most states. There are various control means for reducing the blue haze, but they are quite expensive and represent an added capital cost to the veneer drying process and, in addition, the collected residuals must be disposed of, representing yet another additional cost. It would thus be desirable to have a veneer drying process that reduces or eliminates the generation of the blue haze vapor.

The process for drying veneer employed in the present invention is generally known; however, it has never been developed as a primary drying process. The general process is drying veneer through the use of heated metal plates that are positioned in intimate contact with the wet veneer sheets with a pressure then applied to the veneer while drying takes place to the final uniform moisture content. Past research efforts in contact drying have resulted in published data on the subject, but there is nothing in the prior art that discloses a commercially usable contact drying system that consistently provides uniformly dried veneer and that reduces or eliminates the above-mentioned problems usually present in today's commercially available impinging hot-air dryers.

It is known to use conventional hot presses with flat heated plates for the purpose of flattening and redrying hardwood veneers prior to their being utilized in hardwood plywood manufacture. These hot presses are of a conventional design and simply accept a number of thin sheets of hardwood veneer for the application of heat and pressure for a time period to flatten and redry the already substantially dried hardwood veneer. Such a typical hot press would not be commercially usable for the primary drying of substantial quantities of green veneer or partially dried veneer for use in commodity-type plywood, nor would such a press be useful for drying single sheets of high-value, thin hardwood veneer.

As noted above, the veneer produced by a commercial dryer should have a uniform moisture content, be substantially flat, have a uniform thickness, and be a generally high-quality veneer with a minimum of splits or other surface blemishes. In developing a commercially usable contact drying system for veneer, it will be recognized that, in addition to providing the desired results with respect to the dried veneer, the machinery system must be capable of economic, reliable, and safe operation. One of the requirements is to feed the wet veneer or partially dried veneer sheets into the contact drying system uniformly, quickly, and without damaging the sheets. A further need of the machine system is that the veneer sheets be properly positioned between the heated metal plates of the drying apparatus and, therefore, it is essential that some suitable aligning means be provided. Yet another need within the machine system is for an unloading apparatus to quickly unload the dried veneer from the contact drying system. Ideally, an unloading apparatus would singulate the dried veneer sheets for downstream processing such as cooling or stacking.

With respect to a commercially usable contact drying system and its fit within the overall plywood manufacturing process the drying system must be compatible with production from a veneer lathe in terms of its capacity and, likewise, must also produce dried veneer at a rate to make the downstream panel manufacture economic. Thus the contact drying system must have the flexibility of structure, design, and operating parameters to meet both desired production goals and veneer quality requirements.

In the contact redrying system, any redryer must be able to redry the amount of partially dried veneer that results from the primary drying process. In the situation where a typical known commercial dryer is the upstream process, the amount of veneer to be redried will be substantially greater than if the primary drying process is a contact drying system.

When veneer is generated at a lathe, it flows in a continuous ribbon and is clipped to a predetermined size and then graded and stacked for downstream processing. The stacks of veneer that result must be acceptable for handling within a contact drying system and thus the loading station must be capable of handling the heavy stacks of wet veneer that can weigh on the order of 6,000 pounds. Similarly, the dried veneer flowing out of the contact drying system is again graded and stacked and the outfeed system must be compatible with this downstream requirement.

Accordingly, from the foregoing, it is an object of the invention to dry wet or partially dried veneer to a uniform predetermined moisture content. It is a further object to produce dried veneer that has flat, smooth surfaces affording easier downstream handling. Another object is to provide dried veneer having a uniform thickness. Yet another object of this invention is to reduce the shrinkage during drying, thereby increasing yield. A further object is to reduce splits and other downgrading characteristics. Still another object is to dry the veneer to a uniform moisture content with less energy than with conventional veneer dryers. Another object is to reduce the blue haze emissions usually resulting from veneer drying. Yet a further object of the invention in the redrying system is to quickly redry partially dried veneer without producing overdried veneer or excessive shrinkage. It is likewise an object of this invention to provide contact drying systems that are economic with respect to the initial capital costs and which, in the economic sense, provide substantial benefits over conventional veneer drying systems. Yet another object is to provide contact drying systems that are compatible with the plywood manufacturing system from the veneer lathe to the panel press.

These and many other objects of this invention will be more completely understood and appreciated after reading the detailed description to follow while referring to the attached drawings.

SUMMARY OF THE INVENTION

Briefly stated, the presently claimed invention is practiced in one form by an apparatus for indexing a large rotatable frame having a substantial portion of its mass mounted outwardly of a main bearing structure and on the periphery of the frame. A plurality of indexing arms extend outwardly from adjacent the main bearing and toward the periphery of the frame. Circumferentially and uniformly spaced on the periphery of the frame are a plurality of means for releasably grasping the ends of the indexing arms in a sequential manner. At the base of the indexing arms there is located means for turning the indexing arms about a vertical axis. When the releasable grasping means are holding the arms, the turning means can index the frame through a predetermined angle and, when the grasping means is released or retracted, the arms can be returned through a predetermined angle.

BRIEF DESCRIPTION OF THE DRAWING

FIG. 3 is a front elevation view partially cut away showing a modular multi-opening hot press partially loaded with wet veneer.

FIG. 4 is a view similar to FIG. 3 showing the hot press in its closed configuration.

FIG. 5 is a side elevation view of a plurality of the metal plates within a hot press.

FIG. 6 is a cross-sectional view taken along line 6—6 of FIG. 1 and shows the main bearing structure supporting the rotatable frame.

FIG. 9 is a side elevation view depicting the aligning apparatus in its retracted position.

FIG. 10 is a view similar to FIG. 9 showing a portion of the aligning apparatus ready to sequence forward.

FIG. 11 is also a view similar to FIG. 9 showing the aligning apparatus in its forward position urging a veneer sheet into proper alignment in a press opening.

FIG. 12 is a front elevation view taken along line 12—12 of FIG. 11.

FIG. 13 is a top plan view partially cut away to illustrate the indexing apparatus for the rotatable frame.

FIG. 14 is a cross section taken along line 14—14 of FIG. 1 and depicts, in part, the indexing ring frame mounted about the main circular bearing.

FIG. 15 is cross-sectional view taken along line 15—15 of FIG. 13 and illustrates the indexing arm latching mechanism in its position for indexing the rotatable frame.

FIG. 16 is a view similar to FIG. 15 illustrating the latching mechanism in its retracted position.

FIG. 17 is a side elevation view taken along line 17—17 of FIG. 1 showing a modular hot press in its tilted position for unloading dried veneer.

FIG. 18 is a side elevation view taken along line 18—18 of FIG. 1 illustrating the inclined slide plate at the unloading station.

DESCRIPTION OF THE PREFERRED EMBODIMENTS

Overall Veneer Drying System

Figure 1:
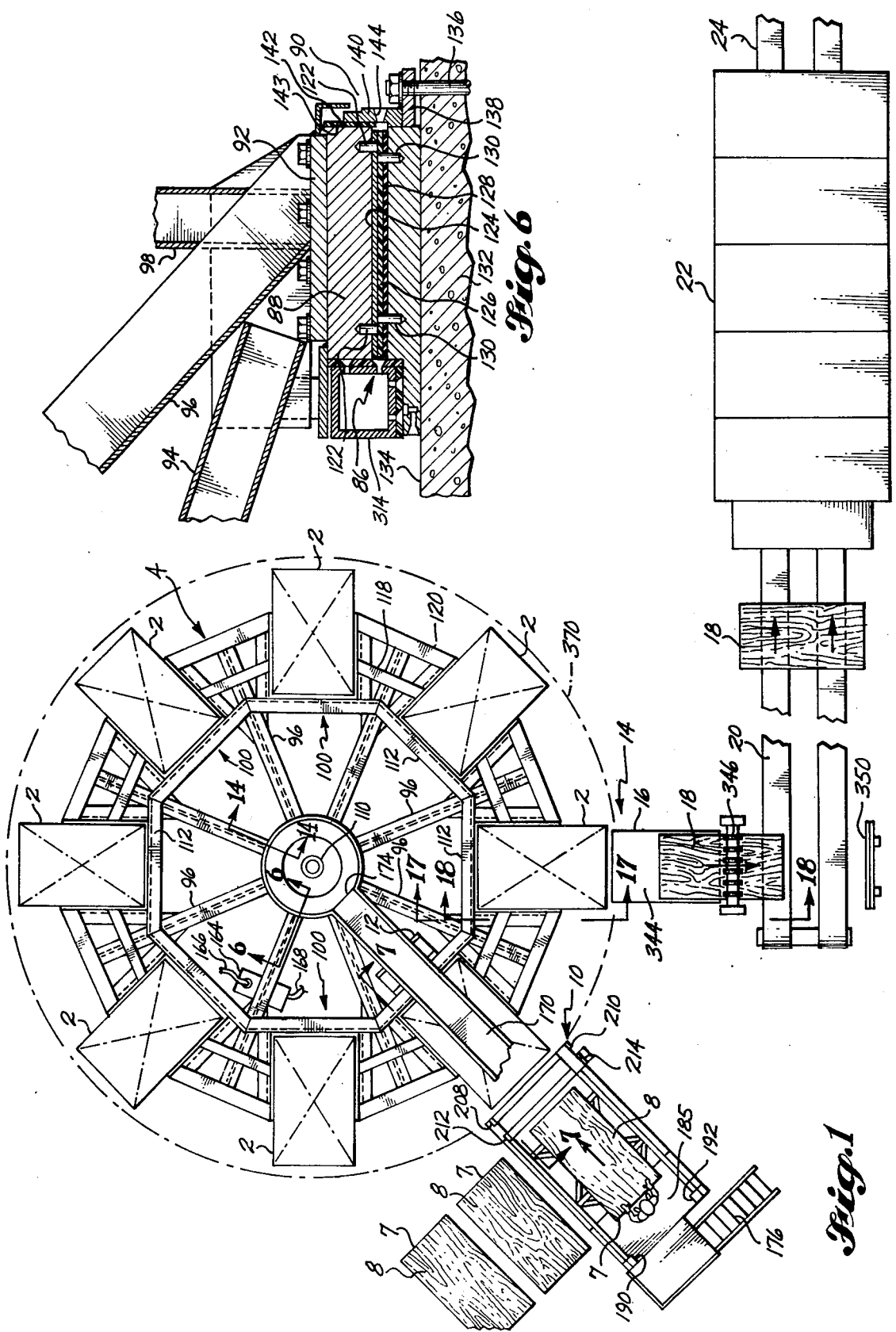
FIG. 1 is a top plan view partially cut away at certain areas showing the general arrangement where a plurality of hot presses are mounted on a rotatable frame.
Figure 2:
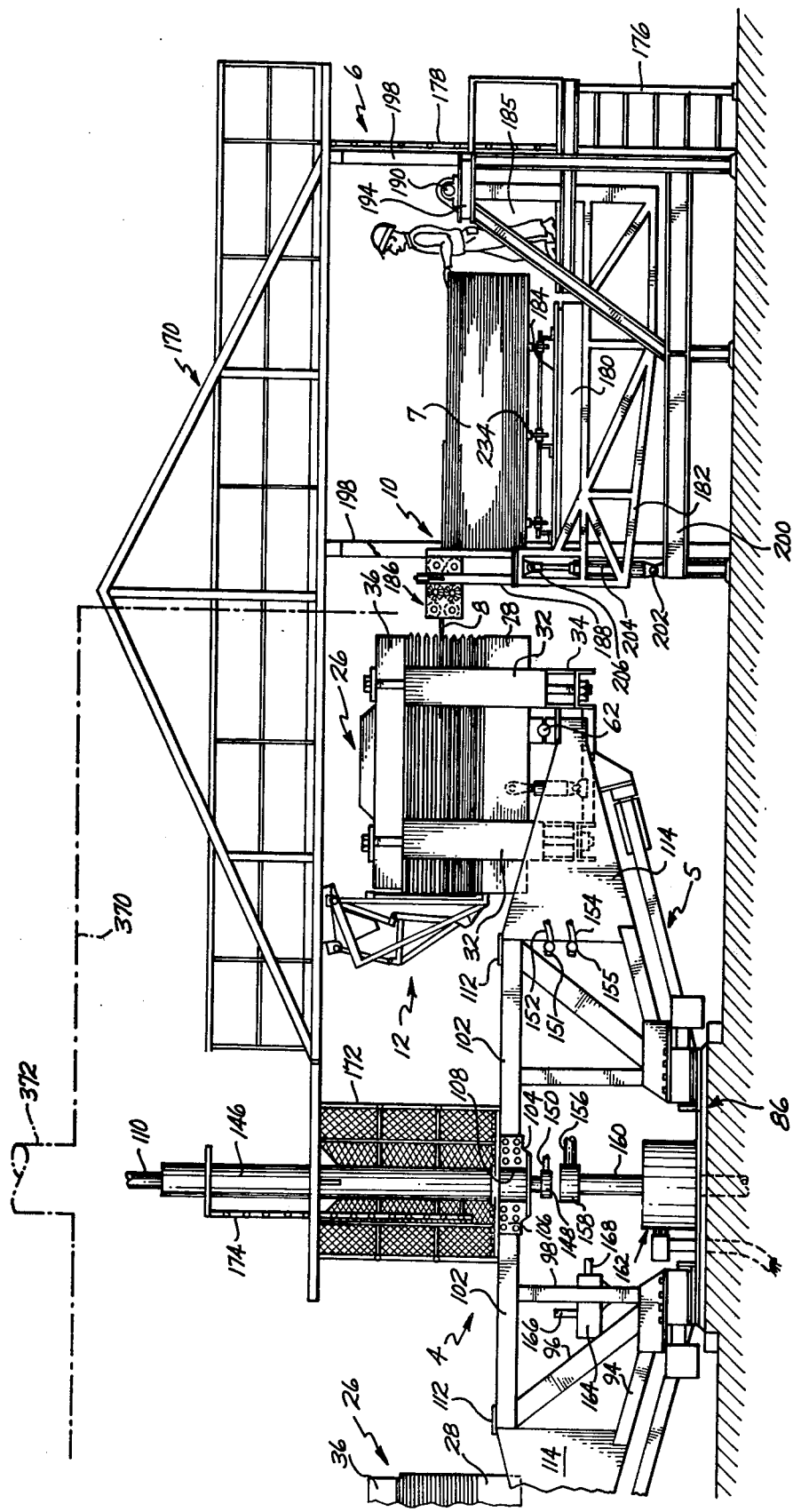
FIG. 2 is a side elevation view taken through section line 2—2 of FIG. 1 and depicts a modular multi-opening hot press mounted on its frame and being fed with wet veneer sheets.
Figure 7:
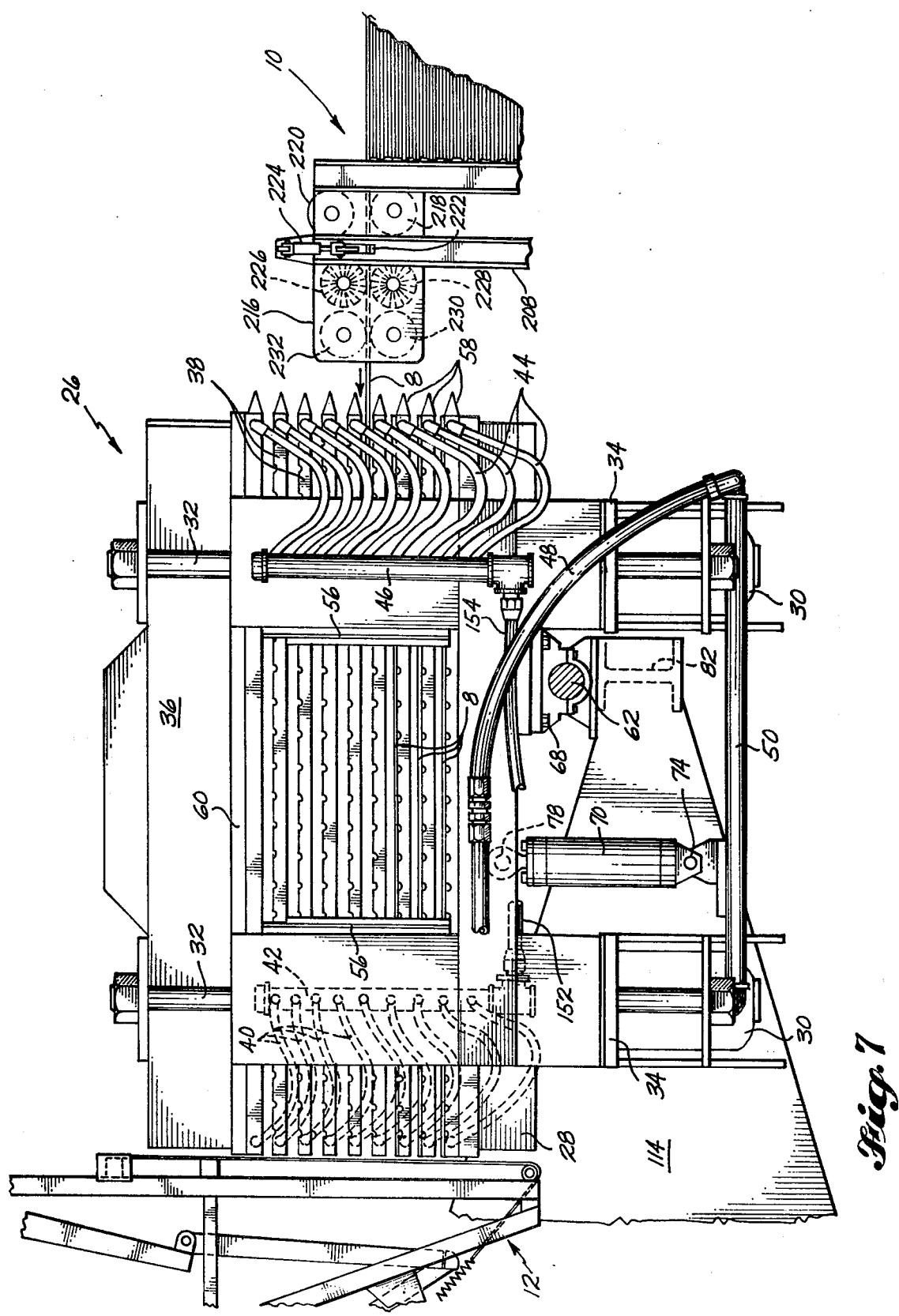
FIG. 7 is a view taken along line 7—7 of FIG. 1 and shows a portion of the loading apparatus together with a multi-opening hot press being loaded at the loading station.

Referring first to FIGS. 1 and 2, a veneer drying system is shown that has a high drying capacity and will be suitable for drying wet or green veneer sheets. A plurality of modular contact veneer dryers 2 are mounted on a rotatable frame generally indicated at 4 that supports the dryers 2 on its periphery. All of the dryers 2 are mounted in substantially the same horizontal plane and frame 4 is indexed about by an indexing mechanism generally indicated at 5 in a clockwise direction.

A loading station generally indicated at 6 functions to feed individual veneer sheets 8 into a waiting dryer 2 from stack 7. After a dryer is filled by a loading or feeding apparatus 10, frame 4 is indexed bringing another modular dryer 2 to the loading station 6. As the veneer sheets 8 are fed into a dryer 2, an aligning apparatus, generally indicated at 12, functions to position each sheet within the dryer. As the dryers 2 index about, each will eventually reach the unloading station generally indicated at 14 which is circumferentially adjacent loading station 6. At unloading station 14 there is an unloading apparatus generally indicated at 16 that functions to unload and singulate the now-dried veneer sheets 18 from dryers 2. Unloading apparatus 16 places the singulated dried veneer sheets 18 onto a transfer conveyor 20. Transfer conveyor 20 carries the singulated veneer sheets 14 into the next downstream process which can be, for example, a standard veneer cooler 22, wherein the hot dried sheets are cooled to a suitable temperature. An outfeed conveyor 24 carries the still-singulated cooled veneer sheets further downstream where they can be, for example, graded and stacked into separate stacks of dried veneer.

There now follows a detailed description of each of the major subsystems, the first being a description of an individual modular dryer 2.

Modular Veneer Dryer

Referring to FIGS. 2-4, 5, 7, and 17 a detailed description will be given of a modular dryer. Each modular dryer is comprised of a modified typical commercially available hot press 26. A plurality of these hot presses 26, as previously pointed out, are mounted about the periphery of rotatable frame 4. First, a brief description will be given of the standard commercially available hot press and then the specific necessary modifications will be described to allow the hot press 26 to function according to its intended purpose. Hot presses 26 are commercially avilable from a number of different manufacturers, one of them being Lamb-Grays Harbor, Inc. of Hoquiam, Wash. These hot presses 26 are typical in that they are comprised of a movable base platen 28 to which are operatively connected at its bottom surface two hydraulic press cylinders 30. A plurality of upstanding columns 32 support the bottom fixed base member 34 in a fixed relationship with the combined fixed platen and upper base member 36. As will be well understood by those skilled in the art, there are positioned between movable platen 28 and fixed platen 36 a plurality of guided vertically movable metal plates 38. Thus with the plurality of plates 38 each modular dryer 2 will be a multi-opening hot press whereby when the press cylinders are in their lowermost positions, there will be provided a plurality of openings between adjacent metal plates 38 for the accommodation therein of thin sheet material. Of course, when press cylinders 30 are extended, the press closes and the metal plates 38 will exert uniform predetermined contact pressure on whatever sheet material is placed within the openings. Standard steam lines 40 comprised of flexible housing extend from a steam header 42 to the metal plates 38. The metal plates 38, of course, have steam conduits within them to allow the steam to heat each metal plate to a uniform predetermined temperature. The purpose, of course, is to provide a uniform predetermined temperature at the faces of each of the metal plates 38. Similarly, the plurality of condensate lines 44 extend from metal plates 38 to a condensate header 46. A flexible hydraulic line 48 feeds the necessary hydraulic fluid into fluid header 50, which in turn allows the hydraulic fluid to flow into press cylinders 30.

As previously pointed out, upon opening and closing of presses 26, the metal plates are movable up and down a set distance with the exception of the top plate, and guided so that their movement is always within the same planar area. This is conventional structure for hot presses. In FIG. 17 the guiding and distance setting means is generally depicted at 52. Each metal plate 38, again except the top plate, has a set of stops or hangers, with each stop indicated at 54, fixed to its opposed side edges that rest on step plates 55 when the press is open. Appropriately designed and positioned slide mechanisms 56 serve to control lateral movement of plates 38. This structure simply allows the metal plates to open and close sequentially and, since the hot presses shown in the figures are of the upclosing type, it will be appreciated that when the press is opening the top opening will be the first to open, progressing sequentially to the bottommost opening. Conversely upon closing, the first opening to close will be the bottommost. This opening sequence and structure is conventional and will not be further described.

Since wet veneer sheets 8 are fed into the infeed side of a hot press 26 at loading station 6, each metal plate 38 has a laterally extending nose guide member 58 fixed to its front edge. The purpose of the nose guide is to help in the infeeding of each veneer sheet into each opening when a hot press is being loaded. Another aspect of hot press 26 that is conventional is that the top and bottom metal plates are fixed to the movable and stationary platens, 28 and 36 respectively, through a layer of insulation indicated at 60.

A special modification for hot presses 26 is their mounting structure. Each hot press supported on frame 4 is mounted thereto on a shaft 62 that is supported by spaced mounting blocks 64, 66. Each press is attached to shaft 62 through suitable bearings 68. As can readily be seen, the bearings 68 provide a tilt axis that extends laterally across the bottom of a press 26 and which is forward of the press center line. The rotatable mounting is provided in order to allow each individual hot press 26 to be tilted forward and downwardly with respect to the horizontal reference plane on which the plurality of hot presses 26 are mounted. The tiltable feature is clearly seen when referring to FIG. 17. A pair of tilt actuating cylinders 70, 72 are positioned so as to be on either side of each hot press 26 with one end of each being pinned to a part of frame 4 at connection points 74, 76 respectively with the other end being pinned at connection points 78, 80 respectively on a part of fixed base number 34. Cylinders 70, 72 have a retracted position where they maintain each press in its horizontal orientation and an extended position where they tilt a press 26 about the tilt axis downwardly to an angle of approximately 35° from horizontal. A press 26 is shown in its horizontal position in FIG. 7 and in its downwardly tilted position in FIG. 17. While it will be described in more detail later, it will be pointed out here that blocks 64, 66 are supported on frame 4 by I beam sections each indicated at 82.

Metal Plate Design

As was previously pointed out, the metal plates 38 within each modular hot press 26 are of a standard typical design with one major exception. Typically, the area of metal plates 38 for veneer drying will be on the order of 55" by 105" to accommodate the typical sheet veneer size. Other sizes, of course, could be incorporated into a standard hot press depending upon the size of the veneer sheet to be dried. Referring specifically to FIG. 5, several individual metal plates 38 are depicted one atop the other. This view would be a side elevation view looking toward the hot press. Positioned on the top surface of each metal plate 38, although it will be the bottom surface of the press opening, is a plurality of grooves each indicated at 84. The primary function of grooves 84 is to provide conduits for the escape of the water and vapor that is generated during the contact drying process. The spacing and sizing of grooves 84 is important in that a proper relationship must be maintained between the actual contact surface area on the veneer and the open area provided by the grooves. It has been found that grooves 84 should be substantially parallel and positioned on approximate 1.5" centers, although a range for the centers of from 0.50"–6.0" has been found to give satisfactory results. Of course, it will be appreciated that as the groove area increases relative to the surface contact area, the drying rate will be altered; that is, it will take longer to dry the same sheet of veneer, owing to less direct contact with a heated metal plate. While grooves 84 are shown as running perpendicular to the long plate dimension and perpendicular to the grain of the veneer, satisfactory results have been obtained with the grooves running with the length of the plate and parallel to veneer grain. Similarly, a crisscrossing pattern with the grooves crossing at 90° angles has also been found to give satisfactory results. However, while the water and vapor exhaust grooves 84 should be simple in structure, they must be of suitable cross-sectional shape in order to carry out the necessary function.

As previously noted, the primary function of each groove is to serve as an exiting channel for the water and steam that will be generated during the drying process. The open area at the plate surface provided by the grooves must not be overly large so as to reduce the drying rate and time. It has been found that a ratio of approximately 3:1 plate contact area to open groove area will allow both moisture removal and an efficient drying rate. In addition, another requirement is that the grooves be easy to clean and preferably that they be self-cleaning. A particular design that has been found to give good results and which is essentially self-cleaning is the design depicted in FIG. 5. It will be noted that grooves 84 are positioned only on the top surfaces of each metal plate (bottom plate of each press opening) and the reason is to reduce the tendency for small wood particles to become lodged in the grooves. Oftentimes when a sheet of veneer is being loaded into a press opening, it will carry with it debris and other particles on its top surface and, when a press is closed, the particles will be forced into the veneer. With grooves on the top of a press opening, oftentimes the wood particles were wedged into a groove which resulted in a blockage to moisture removal. The particular groove design depicted is $\frac{1}{8}''$ in depth, $\frac{3}{8}''$ across the opening, $\frac{1}{8}''$ across the bottom and with 45° inclined sides. This groove design has been found to be essentially self-cleaning in that, as steam is generated and is exhausted through the grooves, the hot steam will tend to remove material that would otherwise be accumulated. Other groove designs have been found to give satisfactory results, such as square grooves, V-grooves, U-grooves, and the like. The groove design as depicted in FIG. 5, however, does give satisfactory results and is easy to machine into the metal plates.

It has been found that the use of the parallel grooves extending across the surface of the metal plates 38 results in consistent uniformly dried veneer within a narrow desired moisture content range. As will be further described later, the use of the grooves in the metal plates allows the process parameters employed to dry wet veneer, that is, a constant temperature within a range of from 275° to 400° F. and a predetermined constant pressure within a range of from 10 to 100 psi. Further, it is possible to dry a wide range of wood species, a wide range of thicknesses, and a wide range of initial moisture contents all within short time periods when compared to conventional drying processes. And, as earlier pointed out, the contact process provides significantly improved veneer for plywood manufacture. Additionally, when redrying partially dried veneer, the utilization of the grooves also makes it possible to quickly and uniformly dry the partially dried veneer.

Main Bearing and Frame Structure

Referring now to FIGS. 1-4, 6, 7, and 13, a detailed description will be given of the main frame structure 4 that supports the modular hot presses 26, together with the main bearing structure generally indicated at 86. First, it is to be noted that the rotating frame 4, if eight modular hot presses are to be mounted on it, will be supporting approximately 250 tons and the structural design must accommodate that weight with structural and safety requirements both satisfied. Frame 4 is a carousel-type truss frame mounted on an annular steel ring 88. Within the opening 90 of steel ring 88 there can be positioned, as will be described later, a plurality of conduits and the like for the entry and exit of electrical power, steam, and/or condensate. Firmly attached to steel ring 88 through a plurality of base plates 92 bolted to steel ring 88 is a plurality of upwardly extending beam members 94, 96, and 98. Since there are eight presses 26 mounted on frame 4, for structural purposes there will be eight sets of beam members 94, 96, and 98 and each adjacent set of members 94, 96, and 98 will be spaced so as to support a modular press 26 radially outwardly therefrom on a press mounting frame generally indicated at 100. Extending horizontally and radially inwardly across the tops of the members 94, 96, and 98 are a plurality of connector beams 102 that are joined together at a central connection area indicated at 104. At the connecting area, the beams 102 are joined together through the use of an annular connection means 106 having a conduit 108 therein for the passage through it of steam supply pipe 110.

Frame 100 is comprised of a plurality of horizontally extending cross connectors 112 that serve to tie the beam members 94, 96, 98 and 102 together. Extending outwardly from cross members 112 at their joinder points with horizontal beams 102 are the pairs of side supporting plates 114, 116 respectively which form a portion of the press mounting frames 100. It is on the side supporting plates 114, 116 that each of the I beam sections 82 is mounted for supporting the tiltable hot presses 26. Similarly, tilt cylinders 70, 72 are attached to supporting plates 114, 116 through the pinned connection points 74, 76. Serving to provide rigidity to supporting plates 114, 116 are a plurality of horizontal laterally extending support members 118, 120. The support members 118, 120 serve to tie supporting plates 114, 116 together at the periphery of rotable frame 4 ensuring the necessary rigidity and support for each individual press mounting frame 100.

Turning now to the main bearing structure 86, it may be seen when referring to FIG. 6 that the bearing is comprised in part of the annular steel ring 88. Positioned on the bottom of ring 88 and held in place by a plurality of dowels 122 is a thin annular steel ring 124. Ring 124 is comprised of segments that extend about the circumference of ring 88. It is segmented, in part, to allow for lubrication. Juxtaposed against and beneath the thin steel ring 124 is the annular slide ring 126. It is the lower surface of steel ring 124 and top surface of slide ring 126 that forms the bearing plane for rotatable frame 4. Positioned directly below slide ring 126 is a resilient annular ring 128. Slide ring 126 and annular ring 128 are fixed in position by a plurality of downwardly extending dowels 130. Both slide ring 126 and resilient annual ring 128 are also segmented. The dowels 130 extend into and fix rings 126 and 128 in position relative to an annular steel base ring 132. Base ring 132 is in turn firmly attached to foundation 134 through any suitable means such as through a plurality of bolts 136 which extend upwardly from foundation 134 and through a plurality of horizontal flanges 138 attached to ring 132. Providing a side bearing structure is an upwardly extending circumferential flange 140 located so as to be adjacent to the inner vertical face 142 of ring 88. The upwardly extending flange 140 and a vertical slide ring 143 function to constrain rotatable frame 4 on its horizontal main bearing structure 86. Provided within flange 140 is lubrication inlet 144 which allows lubricating fluid to flow radially outwardly over the sliding elements within main bearing structure 86.

The slide rings 126, 143 may be comprised of, for example, a plastic material and it has been found that a phenolic composition impregnated with graphite provides satisfactory results. The resilient annular ring 128 may be comprised of, for example, a rubber bearing pad and is positioned beneath the slide ring 126 to accept concentrated loads that may be experienced during operation. The resiliency of the rubber pad accepts the loads without causing damage or failure to any of the other structural elements. Slide ring 143 may also be comprised of a plastic material such as the phenolic composition impregnated with graphite.

Utilities

As previously pointed out, hot presses 26 are heated through the use of steam and the opening and closing functions and the tilting function are hydraulically powered. Because the presses rotate, assemblies must be provided for bringing steam into the rotatable frame 4 as well as for directing condensate out. In addition, the hydraulic fluid must be provided to each of the presses and electrical power must also be provided for the various electrically operated components within the rotating system. As previously pointed out, the steam is supplied through steam supply pipe 110 which in turn is surrounded by a layer of insulation 146. Steam is supplied vertically through pipe 110 and enters the frame 4 through conduit 108. A series of expansion joints (not shown) may be provided along the steam pipe to accept the thermal movements. Steam pipe 110 terminates at a rotary joint 148 from which extends at least one radially extending steam conduit 150 which in turn opens into a circular steam manifold 151 that is mounted on frame 4. From the steam manifold the plurality of steam lines 152 are directed to the steam headers 42. A similar assembly is provided for the condensate from the individual hot presses 26. From each condensate header 46 on a press 26 a condensate line 154 will be directed to a circumferentially extending condensate header 155 from which will extend radially at least one condensate 156. Condensate line 156 will be connected to another rotary joint 158 which in turn connects to the central condensate outflow pipe 160.

Electrical power is supplied within central opening 90 at the bottom of frame 4 through a conventional slip ring assembly indicated generally at 162. As may be seen in FIG. 2, the slip ring assembly 162 surrounds the condensate outflow pipe 160.

The hydraulic power is supplied through a self-contained conventional tank and pump assembly 164. The assembly 164 is powered by electrical energy supplied through slip ring assembly 162. Within the tank and pump assembly 164 there is the necessary equipment to pressurize the hydraulic fluid and direct it to its point of use through outlet line 166. An inlet line 168 serves to return the hydraulic fluid to the tank and complete the circuit. As with the steam supply system, the fluid power supply system may include headers (not shown) for directing the high-pressure fluid to hydraulic lines 48 for opening and closing presses 26. In addition, another header (not shown) may be provided for distributing hydraulic fluid to the plurality of tilt actuating cylinders 70, 72 at each press 26. Of course, also provided with tank and pump assembly 164 will be the necessary valving to control the various fluid flows.

Permitting access to the central area of frame 4 is an overhead walkway generally indicated at 170. At the end of walkway 170 is a downwardly extending circumferential cage assembly 172 and a ladder 174. A maintenance operator can mount the walkway 170 through stairs 176 and ladder 178, cross over walkway 170 and descend the ladder 174 and perform maintenance functions within the central part of frame 4.

Sheet Loading Apparatus

Referring now to FIGS. 1, 2, 7, and 8, the veneer loading apparatus will be described. Positioned just radially outwardly of the circle defined by the circumferential travel of the outermost point on a press 26 is feeding apparatus 10. As previously noted, the function of feeding apparatus 10 at loading station 6 is to sequentially feed at least one veneer sheet 8 into each opening of an awaiting hot press 26. The sequence could be from either top to bottom or from bottom to top. However, in the present embodiment, the sequence is substantially automatic from bottom to top. The feeding apparatus is comprised of a platform 180 which is mounted on a pivoting frame 182. At the front portion of platform 180 is a typical commercially available scissors lift 184 (available from American Manufacturing Company of Tacoma, Washington) which is capable of supporting and adjusting the vertical height of a stack of veneer. At the rear portion of platform 180 is a space 185 for an operator where he will function to pick individual sheets of veneer from the top of the stack and urge them toward and into the feeder mechanism generally indicated at 186. Feeder mechanism 186 extends laterally across the upper front edge of feeding apparatus 10 and is supported by an upstanding front portion 188 of pivoting frame 182. Positioned in substantially the same horizontal plane as feeder mechanism 186 is a pair of laterally spaced bearings 190, 192 that support and allow frame 182 to pivot. Bearings 190, 192 are mounted on horizontal support arms 194, 196 which in turn are mounted on stationary upstanding beam members each indicated as 198. It will be understood that the location of pivotal axis for frame 182 extending through bearings 190, 192 will provide a relatively small angular variation from the top opening of a press 26 to the bottom. This, of course, provides a substantially in-line feeding relationship from feeding apparatus 10 into the plurality of openings in hot press 26. Mounted on a stationary supporting member 200 at pinned connection point 202 is the vertically extending sequencing cylinder 204. The other end of sequencing cylinder 204 is connected to pivoting frame 182 at pinned connection point 206 at a position located along the front lateral edge of frame 182. Of course, the function of sequencing cylinder 204 is to pivot the frame 182 upwardly in a sequencing manner allowing the operator and feeder mechanism 186 to load each opening sequentially with at least one sheet of wet veneer. When the hot press being loaded is full, cylinder 204 will then retract back to its starting position to await the next opened hot press and feeding cycle.

Feeder mechanism 186 is mounted on front portion 188 of frame 182 and is comprised of pairs of laterally spaced, upwardly extending beam members 208, 210 and 212, 214 respectively. Supported on the beam members are a plurality of roll pairs mounted within a suitable frame 216. The nips of each roll pair are substantially in line and will, of course, be positioned substantially in line with each opening of a hot press as frame 182 is sequenced through its cycle. Additionally, the top sheet of veneer 8 within the stack will be maintained at a height atop scissors lift 184 that will be substantially in line with the nips. The first roll pair, that is the one adjacent the stack of veneer, is comprised of a bottom cylindrical roll means 218 and a top roll means 220 that may be comprised of a plurality of typical donut rolls and which can be vertically movable up and down to allow an operator to feed the top sheet into the feeder mechanism 186 where it will initially abut vertically displaceable gate 222. Gate 222 is controlled by suitable actuating means 224 which may be comprised of a pair of laterally spaced hydraulic or air cylinders. The next set of rolls within the feeder mechanism 186 are top and bottom brush rolls 226, 228 respectively. The brush rolls serve to remove debris from the surfaces of a sheet of veneer being fed into an opening. The last set of rolls or the set nearest the press is also comprised of a bottom cylindrical roll 230 and a top roll 232 that may be comprised of a plurality of typical donut rolls for feeding veneer. As is typical with most scissors lifts, the operator will have a foot switch that controls the vertical movement of stack 7 and will keep the top sheet substantially in line with the nips of the roll sets.

The plurality of feed chains, each indicated at 234, extend laterally of the scissors lift 184 and function to convey a new stack of wet veneer to a position atop lift 184.

Figure 8:
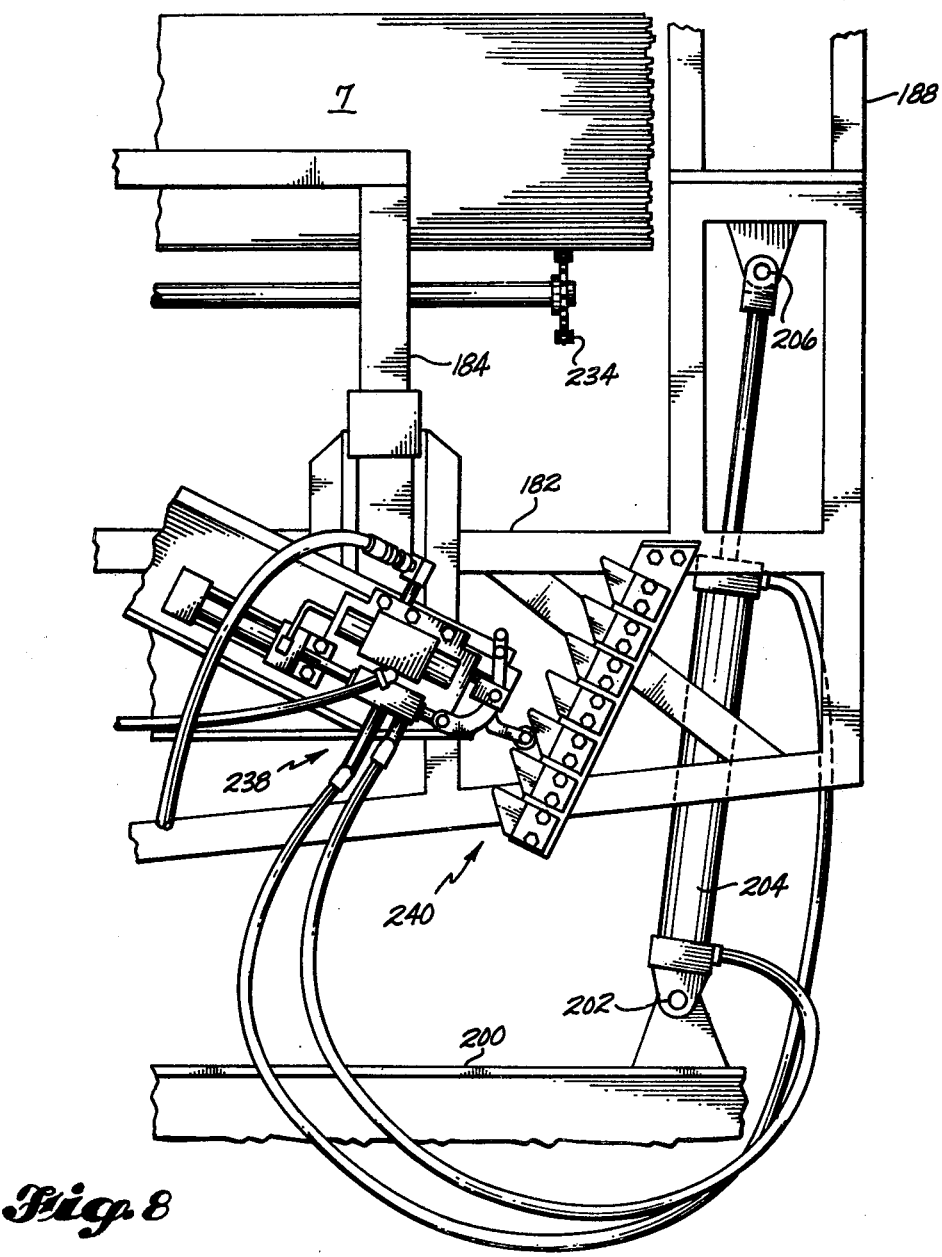
FIG. 8 is a side elevation view showing a portion of the sequencing mechanism for the loading apparatus.

In FIG. 8 there is depicted a cam-operated timed valving mechanism that functions to control cylinder 204 and therefore the sequencing of pivoting frame 182. The valving is generally indicated at 238 with the cam and follower mechanism generally indicated at 240. The control system operates on a timed sequence and it has been found that an approximate 3-second time period for feeding a sheet of veneer into an opening and sequencing to the next opening gives satisfactory results. The total time to feed an eight-opening hot press and retract the frame 182 to its lowest position is an approximately 30-second cycle. This includes a lag time to allow the rotatable frame 4 to index another step to bring an opened press into alignment with feeder mechanism 186. Of course, those skilled in the art will recognize that there are several alternative means for controlling the sequencing of pivoting frame 182 and feeder mechanism 186 and that FIG. 8 depicts one suitable means.

It will be recognized that a typical commercially available vacuum feeder could be employed for feeding the sheets into feeder mechanism 186 from the top of a stack 7.

Aligning Apparatus

Referring now to FIGS. 2 and 9-12, the aligning apparatus 12 will be described. Aligning apparatus 12 is suspended from overhead walkway 170 and is substantially in line with feeding apparatus 10 on the opposite side of a press when located at loading station 6. As previously noted, the function of aligning apparatus 12 is to properly position each incoming sheet of veneer 8 within its press opening. Since the feeder mechanism 186 will oftentimes place the leading edge of an incoming sheet past the ends of metal plates 38, it is necessary to accurately realign the veneer sheet so they are within the edges of plates 38.

The aligning apparatus 12 is comprised of two operating elements, one element being the resilient flexible backing member 242 mounted on a pivotal frame 244 and the other element being a patting face 246 also mounted on a pivotal frame 248. Pivotal frame 244 is comprised of a pair of laterally spaced downwardly depending arms 250, 252. Each arm 250, 252 is mounted at its upper end in a rotatable manner on shaft 254. Arms 250, 252 extend downwardly for a distance that is slightly below the lowermost metal plate 38 within a press 26. Serving to provide rigidity to arms 250, 252 are upwardly extending rear arms 256, 258, which are attached to arms 250, 252 respectively. The rear arms 256, 258 are in turn attached to spaced rearwardly extending beam members 260. Beam members 260 in turn are mounted on shaft 254 with arms 250, 252. Serving to pivot frame 244 forward and back about shaft 254 is an actuating cylinder 262 that is pivotally attached at one end to a downwardly depending frame 264 and at the other to a pinned connection point 266 which is in turn attached to a cross arm member 268 connecting beam members 260 rigidly together.

Positioned approximately half way along the length of arms 250, 252 is a laterally extending attachment bar 270 that serves to not only provide rigidity to arms 250, 252, but also to provide an attaching means for the flexible backing member 242. Backing member 242 extends downwardly from attachment bar 270 and around the end of arms 250, 252 over a bottom laterally extending tube member 272. The other end of backing member 242 is attached through spring means 274 to the upwardly extending rear arms 256, 258. Thus the flexible backing member 242 provides a resilient back stop for individual veneer sheets as they are fed into an opening and travel past the ends of plates 38. Backing member 242 has a retracted position as depicted in FIG. 9 and a forward position as depicted in FIGS. 10 and 11.

The pivoting frame 248 is comprised of a pair of downwardly depending arms 276, 278 to which is connected through pinned attachment means 280 the patting face 246. Patting face 246 depends downwardly in a swinging relationship from arms 276, 278 to a lower edge which will be approximately adjacent but below the lowermost opening of a hot press 26. At the upper ends of arms 276, 278 they are similarly mounted on shaft 254 so as to be rotatable thereon but independently of arms 250, 252. As may be seen when referring to FIG. 12, the patting face 246 is substantially rectangular and has a screen 282 over its front face. Screen 282 will sequentially strike the flexible backing member 242 as will be further described later. Extending upwardly and outwardly from the bottom edge of patting face 246 are stiffening members 284. Cross arms 286 meet stiffening members 284 at a point horizontally spaced from pinned attachment means 280. An additional downwardly depending pinned arm 282 supports the rear portion of the patting face 246 in its substantially vertical orientation. Arm 288 is pinned at connection point 290 and at the other end it is pinned at connection point 292. Serving to pivot the patting face 246 forward on arms 276, 278 and pinned arm 288 are a pair of actuating cylinders 294, 296. One end of each cylinder is pivotally attached to an outwardly extending dog member 298, 300 respectively, each of which is fixed to the shaft on which downwardly depending arms 276, 278 are attached. Of course, arms 298, 300 provide the lever arm for sequentially turning the patting face 246. The other end of actuating cylinders 294, 296 are attached at pinned connection points 302, 304 on a frame means 306. Of course, it will be recognized that the pivotal frame 244 and pivoting frame 248 operate independently of one another yet sequentially as will be further described later.

Indexing Mechanism

Referring now to FIGS. 2 and 13-16, the mechanism for accurately indexing rotatable frame 4 and, consequently, the accurate positioning of hot presses 26 will be described. In FIG. 2 the indexing mechanism, as previously noted, is generally indicated at 5. The function of mechanism 5 is, of course, to rotate the frame and accurately align the modular hot presses 26 as they reach the loading station 6 and unloading station 14. It is, of course, absolutely necessary that feeder mechanism 186 be in line with the openings of the press at loading station 6. Likewise, it is important that the hot press at unloading station 14 also be in line with certain parts of unloading apparatus 16.

With an eight-press drying system, frame 4 will be rotated through an angle of 45° upon each indexing cycle. Serving to provide the indexing movement, in part, is a pair of opposed upwardly extending indexing arms 310, 312. At their base, arms 310, 312 are attached to a rotatable circular frame 314 that is journaled about main bearing structure 86. In FIG. 14 the bearing surfaces 316, 318 for frame 314 are depicted. Circular frame 314 fits around annular steel ring 88 and bearing surfaces 316, 318 may be comprised in part of segments 320 of plastic material such as the phenolic composition impregnated with graphite. Frame 314 is mounted so as to be reciprocable in a horizontal plane about the vertical center line of frame 4. At the upper ends of each indexing arm 310, 312 there is a sequentially operable latching mechanism generally indicated at 322. Latching mechanism 322 is comprised in part of a retractable pawl member 324 slidable within slide frame 326 and actuated by a radially extending, upwardly inclined actuating cylinder 328. The opposite end of each actuating cylinder 328 is mounted on a cross member 330 supporting it in its proper position. Depending downwardly and fixedly attached to horizontally opposed supporting members 331 between pairs of adjacent presses 26 are latch blocks 332. Latch blocks 332 are positioned radially so they are approximately in line with the center of gravity of the hot presses 26. Pawls 324 have an extended position as depicted in FIG. 15 where the radially outer end of each pawl will mate with the recess within a latch block 332. In FIG. 16, a pawl 324 is depicted in its retracted position where it is out of the recess in latch block 332 whereby the frame 314 and indexing arms 310, 312 can rotate past the latch blocks 332 and below a hot press 26 to the next adjacent pair of latch blocks 332. The forward direction of rotation of indexing arms 310, 312 is indicated by the directional arrows 334 as shown on FIG. 13, and these arrows indicate the clockwise direction of rotation for the frame 4. The direction will be reversed when the palls 324 are in their retracted positions and the indexing arms 310, 312 index back for the next cycle. The phantom lines in FIG. 13 show frame 314 and arms 310, 312 in a second position, having just been indexed.

Serving to rotate frame 314, and consequently indexing arms 310, 312, is an opposed pair of large hydraulic actuating cylinders 336, 338. At the fixed end of each cylinder it is pivotally attached to a base member 340, while at the other end it is pivotally attached to a horizontally extending lever arm 342 which is mounted on frame 314. Lever arms 342 are, of course, mounted 180° from one another and, when cylinders 336, 338 are actuated, they will serve to apply a turning force to frame 314. When cylinders 336, 338 are actuated to rotate arms 310, 312 in a clockwise direction, pawls 324 will be firmly within latch blocks 332 and torque will be transferred radially to the latch blocks 332 where the tangentially applied force will cause frame 4 to turn through an angle of 45°. After the frame 4 is indexed 45°, pawls 324 will be retracted and cylinders 336, 338 will likewise be retracted turning frame 314 counterclockwise through an angle of 45° back to a ready position for the next indexing cycle.

Unloading Apparatus

At unloading station 14, of course, an unloading apparatus 16 is provided for removing the dried veneer sheets from the hot press 26 then at the unloading station. Referring to FIGS. 1, 17, and 18, the unloading apparatus will be described in detail.

As previously pointed out, each hot press 26 is pivotally mounted on spaced bearings 68 and has a pair of tilt cylinders 70, 72 positioned rearwardly from the bearings in order to tilt the front of the press downwardly and forwardly upon the proper sequential command. Also, as was previously pointed out, the hot presses 26 open sequentially from top to bottom. It has been found that a tilt angle of approximately 35° is adequate to let gravity function to allow each dried sheet to slide forwardly and out of its press opening.

Positioned adjacent to the bottommost opening of the hot press when it is in its fully tilted position is a downwardly inclined slide plate 344 having an inclined angle of approximately 15°. Spaced from the lowermost point on slide plate 344 is a set of driven rolls 346, 348 that function to grasp each downwardly sliding sheet of dried veneer and motivate it outwardly onto transfer conveyor 20. The relative dimensions of slide plate 344 and the spacing between slide plate 344 and the nip of rolls 346, 348 are important in the sheet singulation process. As individual dried veneer sheets 18 begin falling from the openings sequentially, they will strike slide plate 344 beginning at a position close to its lowermost point and gradually the striking point will move progressively higher on slide plate 344. The dimension of the horizontal projection of slide plate 344 and the spacing between the nip of rolls 346, 348 and the end of slide plate 344 should have a ratio of approximately 3:1. By providing this ratio, the dried veneer sheets 18 can be singulated with minimal damage onto the transfer conveyor 20. A backstop 350 is provided on the other side of transfer conveyor 20 to allow each singulated sheet to be positioned atop transfer conveyor 20 after it feeds through rolls 346, 348.

As previously pointed out, transfer conveyor 20 then functions to convey the singulated dried sheets into cooler 22 which may be any commercially available cooler, for example a multi-section cooler manufactured by Coe Manufacturing Company of Painseville, Ohio.

Redrying Apparatus

Figure 19:
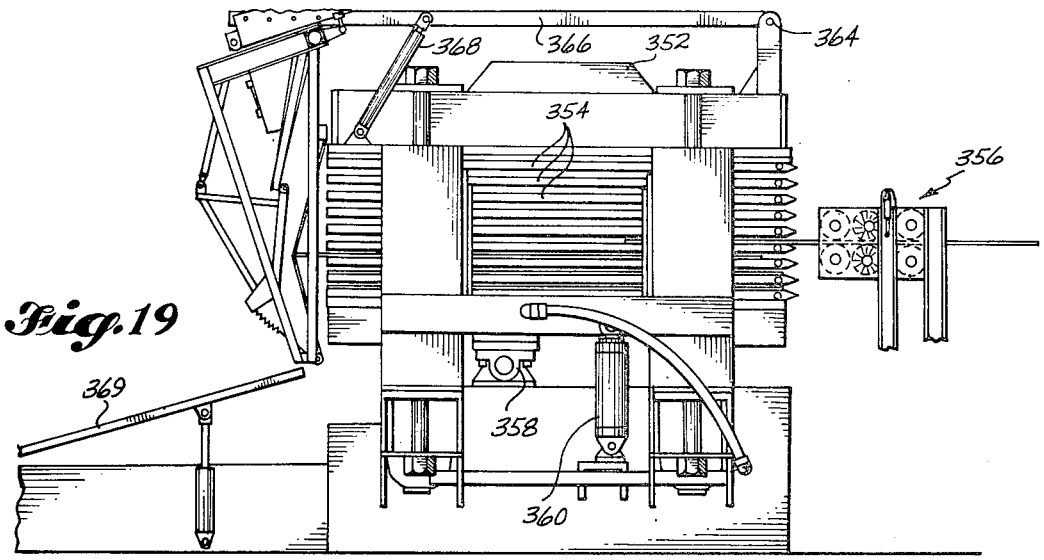
FIG. 19 is a side elevation view illustrating a single hot press that functions as a redryer for partially dried veneer.
Figure 20:
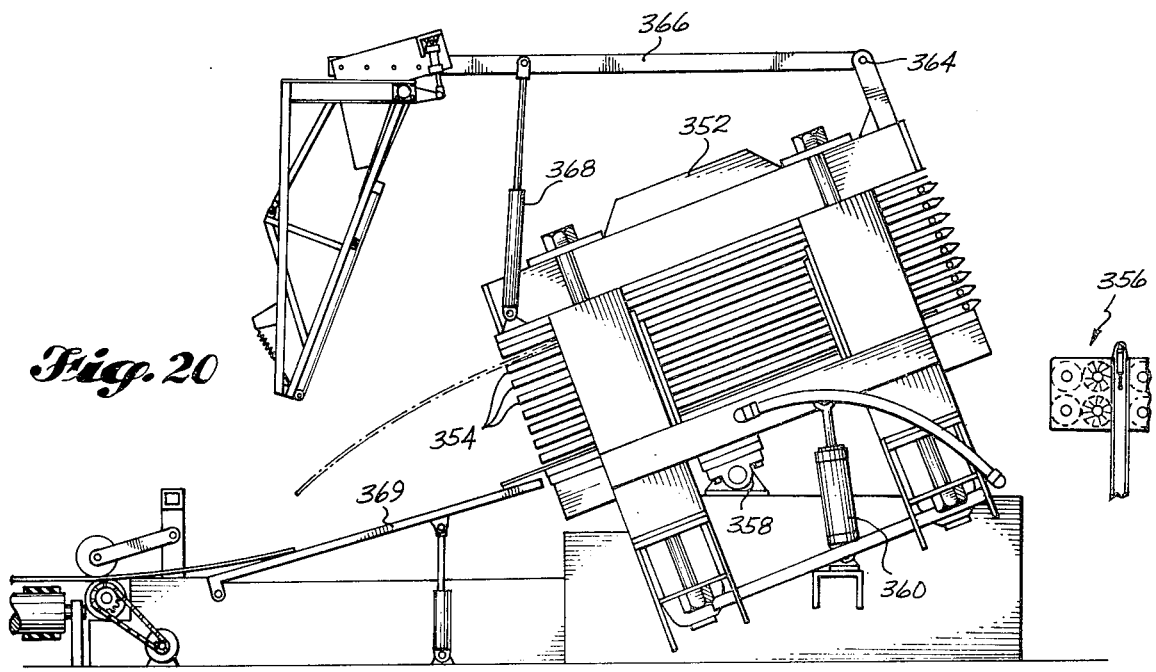
FIG. 20 is a view similar to FIG. 19 illustrating the redrying apparatus being unloaded.

Referring now to FIGS. 19 and 20, a particular redrying apparatus will be described suitable for drying partially dried veneer to a uniform finally desired moisture content. Redrying apparatus may be comprised of a hot press 352 substantially similar to the plurality of hot presses 26 mounted on rotatable frame 4. Hot plates 354 within hot press 352 are substantially similar to the plurality of hot plates 38 within each of the hot presses 26. A similar feeding apparatus 356 is provided to sequentially feed partially dried veneer sheets into hot press 352. The primary structural difference between hot press 352 and a hot press 26 is that the loading side of hot press 352 is tiltable upwardly from feeding apparatus 356 by reversing the positions of the mounting bearings and tilting cylinders. On hot press 352 bearings 358 are mounted towards the back side of press 352 while the tilt cylinders 360 are mounted closer to feeding apparatus 356. Thus the outfeed or unloading side of the hot press is reversed for a redrying system.

Just as with a hot press 26 at loading station 6, it will be necessary to provide an aligning apparatus 362 for accurately positioning each incoming sheet of partially dried veneer. Since press 352 tilts downwardly at its back side, the positioning apparatus 362 must be mounted so as to be movable, allowing unobstructed gravity fall of the redried veneer sheets. In a redrying press, the positioning apparatus 362 can be mounted on the top of press 352 so as to pivot on bearings 364. A pair of laterally spaced arms 366 extend rearwardly from bearings 364 and serve to support the downwardly depending aligning apparatus 362. An actuating cylinder 368 extends upwardly from the top of press 352 to a cross member extending between arms 366 and serves to pivot the entire positioning apparatus 362 upwardly relative to the back side of press 352.

In the redrying hot press 352 the operating sequence is very similar to that of the hot presses on the rotatable frame 4. The feeding apparatus 356 will sequentially feed partially dried veneer sheets into each opening of hot press 352 from bottom to top. After the last sheet has been fed, the press will close and the redrying method will be carried out within the press. After the passage of the predetermined redrying time, the tilt cylinders 360 will be actuated to tilt the press 352 about bearings 358. After the press is tilted, the hot press will be sequentially opened starting from the top opening and progressing to the bottom opening. As each opening is made, the finally dried veneer sheet will exit the hot press in a singulated manner. Prior to the press being tilted, cylinder 368 will elevate the aligning apparatus 362 to a position spaced away from the far side of press 352 whereby enough distance will be provided so that the veneer sheet in the top opening will fall below the lowermost edge of the aligning apparatus 362 and directly onto slide plate 369. This configuration is depicted in FIG. 20 where hot press 352 is shown being unloaded.

Dryer Emissions Control

If, upon operating the veneer drying system as depicted in FIGS. 1 and 2, it is determined that the emission level from the drying process is significant, a collection means may be provided. In FIGS. 1 and 2 the collection means is indicated in phantom lines and may be comprised of a circumferentially extending hood 370 having an outlet conduit 372 to draw off the steam and other emissions generated by the veneer drying process. It will, of course, be recognized that a pressure differential will be generated to draw the emissions upwardly into the hood 370 and out conduit 372. For example, a fan may be conveniently located within conduit 372 at some downstream position (not shown). Similarly, with the redrying hot press a suitable hood (not shown) may be positioned over the top of press 352 which will serve the same purpose of collecting and directing the emissions away from the hot press.

Alternative Designs

In addition to the design where a plurality of modular hot presses 26 are mounted on the periphery of a rotatable frame, it will occur to those skilled in the art that a plurality of modular hot presses can be laid out in alternative configurations. For example, a plurality of hot presses could be placed adjacent to one another in line with a single loading apparatus traversing the distance along the infeed sides of each hot press, loading them each with wet veneer in a sequential manner. Each press could be tiltable downwardly and away from the infeed side to release the dried veneer onto a transfer conveyor. A similar design might include a plurality of hot presses mounted in line on each side of a single outfeed conveyor and with a pair of feeding mechanisms being operable to load the presses on the side opposite the outfeed conveyor. Other configurations will occur to those skilled in the art and all such configurations are intended to be included within the scope of the claims. Similarly, other alternate designs for redrying systems will occur to those skilled in the art. For example, a pair of hot presses may be placed side by side substantially adjacent one another with a single loading apparatus moving between the two presses to feed them and with each press being tiltable away from the feed side to discharge its redried veneer onto a single transfer conveyor. Other alternative designs for redrying systems will also occur to those skilled in the art and they, too, are intended to be included within the scope of the claims.

Veneer Drying Methods

To be described now will be the various methods of drying the wet veneer sheets and the various drying schedules that have been developed for different wood species, veneer thicknesses, and initial moisture contents. Also to be described will be the redrying methods and schedules developed which are also dependent upon species, thickness, and initial moisture content.

An ideal final moisture content for a sheet of dried softwood veneer is from 1 to 5%, while a sheet of hardwood veneer should have a moisture content of from 8 to 15%. The moisture content also should be uniform within this range throughout the sheet. When veneer sheets fall within a moisture content range of from 1 to 5% and 8 to 15%, the glue application process and subsequent pressing into panels is significantly improved as noted previously. The drying schedules have been developed to consistently yield dried veneer sheets that fall within this moisture content range. This is primarily time and temperature dependent. Additionally, the pressure is determined based primarily on wood density since excessive pressure will crush the wood. The correct pressure will restrain wood shrinkage and will provide the increased yield as previously noted. The time for exerting the pressure and applying the temperature will be dependent upon the starting moisture content. In wet veneer sheets the average moisture content of heartwood averages 35 to 40% for a typical western softwood and 75 to 100% a typical for southern softwood, while sapwood averages 100–130% for a typical western softwoodand in southern sapwood the average moisture content ranges from 100 to 120%. In partially dried veneer sheets, any areas within a sheet having a moisture content above 8 to 10% moisture content is subject to being redried.

It thus becomes apparent that in actual production the veneer sheets to be dried should be preselected according to species, thickness, and initial moisture content. When sheets are preselected, the process parameters can be set for those conditions and the efficiency of the system is better. It is, however, not absolutely necessary to sort heart and sap prior to drying because with contact drying the sheets do not become overdry. With partially dried veneer to be redried, thickness and species are the two primary variables since it has already been determined that the sheet has been partially dried.

The following tables of drying schedules will present those conditions for each specie's thickness and initial moisture condition that have been found to give good results for primary drying or redrying sheets of veneer within a modular hot press of the present invention. It should be noted that the thickness range is from 1/10" up to 3/16" with the starting moisture contents in wet veneer ranging from 30 up to 250% in extreme cases. In the case of redried veneer, as was previously noted, the moisture condition is one where there are areas within the sheet that exceed a predetermined moisture content such as 10%. When partially dried veneer is determined to have an excessive moisture content, it will be diverted and directed to the redrying system. As is well known, when veneer sheets pass through a veneer dryer, moisture meters will sense the final moisture content and any sheets having an excessive moisture content will be diverted.

vapor will also be generated and that generated within the veneer sheets will accumulate within the exhaust conduits provided by the substantially parallel grooves 84. While the temperature on the surface of each heated metal plate 38 will be uniform, as the sheet dries heat will be transferred to the wetter areas at a higher rate causing them to dry faster than drier areas. At the end of the predetermined drying time, the moisture content is substantially uniform and at the desired final level.

When drying 1/16" southern pine veneer, which may be taken from either the heart or the sap portion of the log (it is usually sapwood because the logs are small), it can be seen that the drying time is 4¾ minutes at a continuous pressure of 35 psi and a constant plate temperature of 340° F. This drying schedule has been found to give excellent results when drying 1/6" southern pine veneer; providing a veneer sheet with a uniform final moisture content within a range of from 1 to 5%, an excellent surface for the application of adhesive, increased yield due to the restraint provided by the continuously applied pressure, and a generally higher quality dry veneer sheet.

When redrying a partially dried 1/8" thick sheet of Douglas fir veneer, it was determined that a continuously applied pressure of 35 psi at 355° F. for ½ minute gave excellent results. In this case, a partially dried sheet where at least a part of it had a moisture content above 10% was redried to a moisture content within the desired range of from 1 to 5% and with the moisture content being substantially uniform throughout the

TABLE OF PRIMARY DRYING SCHEDULES

| Species | Thickness (inches) | Initial Moisture Condition | Time (minutes) | Temp. (°F.) | Pressure (psi) |
| --- | --- | --- | --- | --- | --- |
| Douglas Fir | 1/10 | Sapwood | 4½ | 335–360 | 35 |
| Douglas Fir | ⅛ | Sapwood | 4½ | 335–380 | 35 |
| Douglas Fir | 3/16 | Sapwood | 6½–8 | 335–380 | 35 |
| Douglas Fir | 1/10 | Heartwood | 2 | 335 | 35 |
| Douglas Fir | ⅛ | Heartwood | 2½–4½ | 320–335 | 35 |
| Douglas Fir | 3/16 | Heartwood | 4½ | 380 | 35 |
| Red Cedar | 1/6 | Heart or Sap | 7–8½ | 360–380 | 15 |
| Black Cottonwood | 3/16 | Heart or Sap | 10 | 385 | 25 |
| So. Pine | ⅛ | Heart or Sap | 3 | 340 | 35 |
| So. Pine | 1/6 | Heart or Sap | 4¾ | 340 | 35 |
| Red Oak | ⅛ | Heart or Sap | 3½–4 | 340–365 | 35 |
| White Oak | ⅛ | Heart or Sap | 4 | 365 | 35 |
| Gum | ⅛ | Heart or Sap | 3 | 340 | 35 |
| Yellow Poplar | 1/10 | Heart or Sap | 2½ | 275 | 70 |
| Yellow Poplar | 1/6 | Heart or Sap | 6 | 275 | 70 |

TABLE OF REDRYING SCHEDULES

| Species | Thickness (inches) | Initial Moisture Condition | Time (minutes) | Temp. (°F.) | Pressure (psi) |
| --- | --- | --- | --- | --- | --- |
| Douglas Fir | ⅛ | Redry | ½ | 355 | 35 |
| Douglas Fir | 3/16 | Redry | ¾ | 350 | 35 |
| So. Pine | ⅛ | Redry | ½ | 340 | 35 |

Taking several examples from within the tables, when drying sheets of Douglas fir veneer that are 1/10" thick and have been peeled from the heart segment of a log, it has been determined that the best drying schedule for the contact drying method of the present invention is a 2-minute time with a continuously applied pressure of 35 pounds per square inch and at a constant temperature of 335° F. During this drying time, the wet veneer will be continuously pressed and heated with the first part of the drying process functioning to drive off the free water held within the veneer sheet. Since the applied temperature is above the boiling point of water, steam entire sheet. The redrying of partially dried sheets was carried out in an apparatus substantially like that depicted in FIGS. 19 and 20.

The drying schedules depicted in the two tables represent optimums selected for the listed species, thickness, and initial moisture condition and are not to be taken as limiting the scope of the present invention. A reasonable range for the various operating conditions in primary drying would include a temperature range of from 250° F. to 400° F., a pressure of from 5 psi to 70 psi, and a time of from 2 minutes to 12 minutes. These ranges are applicable to veneer thicknesses within a range of from 1/10" up to 3/16" and cover a range of species from Douglas fir (western softwood) to southern pine (southern softwood) to oaks and the like (southern hardwoods). For redrying veneer the temperature and pressure ranges are similar; however, the time will be in a range of from 20 seconds to 1 minute for single sheets of veneer. When redrying two sheets per opening, longer times would be required. Additionally, it is believed that the present method and apparatus can be used to dry typical thin hardwood veneers that are on the order of 1/28" to 1/16" in thickness such as birch and oak. These veneers are typically used for face and back veneers in decorative type paneling. It is believed that the temperatures and pressures will be similar to those set forth in the above table but that drying times will be considerably less, such as on the order of from $\frac{1}{2}$ minutes to $1\frac{1}{2}$ minutes for primary drying. Most likely, there will be no resulting partially dried veneer to be redried.

Operation of the Invention

First to be described will be the commercially usable veneer drying system depicted in FIGS. 1 and 2 of the drawings. Assume that wet $\frac{1}{8}$" Douglas fir veneer sapwood is to be dried. From the above table it is seen that the primary drying schedule is $4\frac{1}{2}$ minutes at 335°-380° F. with an applied pressure of 35 psi. The steam supply to each of the individual hot presses 26 is adusted accordingly to provide a uniform temperature over the surfaces of metal plates 38. The pressure adjustment for the applied pressure is made whereby the tank and pump assembly 164 will be controlled to generate the exact pressure through press cylinders 30. Pressurized fluid will also be generated for the other actuating cylinders. Since the drying time will be $4\frac{1}{2}$ minutes, the various operating cycles will be based on this predetermined time. The $4\frac{1}{2}$ minutes is the elapsed time between the closing of the hot press that has just been loaded with wet veneer and the opening of the same hot press after indexing around on frame 4 and opening at unloading station 14. As previously noted, eight modular hot presses 26 are mounted on frame 4 and it can be determined that eight presses frame 4 will be indexed every 33±2 seconds. It should thus be appreciated that when an open hot press is being loaded at loading station 6, the loading apparatus 10 will have at least 33 seconds to fill the press. Similarly, at unloading station 14 the press will be actuated to tilt by way of tilt cylinders 70, 72 and then the press will be sequentially opened starting from top and progressing to the bottom with each dried veneer sheet sequentially falling atop inclined slide plate 344. Each dried singulated sheet will slide into the nip between rolls 346, 348 where it will be motivated to a position atop the transfer conveyor 20 from which location it will be conveyed into cooler 22.

Of course, once the heating fluid for heating metal plates 38 is circulating through the steam supply circuit, the resulting condensate must be collected in the condensate circuit and directed out through outflow pipe 160. Also, when the frame 4 is started up for continual indexing, the lubrication system will be activated to provide suitable lubricating fluid to, for example, the main bearing structure 86.

With all operating parameters up to operating conditions, an open hot press is positioned at loading station 6. A stack of wet veneer has been positioned atop scissors lift 184 and the top sheet will be substantially in line with feeder mechanism 186. Prior to the first veneer sheet being fed into the awaiting hot press, the resilient backing member 242 will be moved on its frame to a position substantially adjacent the rear edges of the metal plates or openings of the press. The patting face 246 will remain in its retracted rear position. This configuration is depicted in FIG. 10.

The operator at loading station 6 will now activate the feeding cycle to begin feeding veneer sheets into the awaiting hot press. The feeding cycle is timed for approximately 3 seconds between the loading of each sheet. Starting in the down position, the cylinder 204 will sequence upwardly as each sheet is fed. The vertically movable gate 222 will allow each sheet to be positioned against it and it will then be raised when the timed command signal is given. When each veneer sheet is fed into an opening, the top and bottom brush rolls 226, 228 serve to remove any debris. As each veneer sheet is fed into an opening, the feeder mechanism 186 will tend to motivate the sheet past the rear edges of metal plates 38 where each sheet will impact against backing member 242. At that instant, the patting face 246 will be actuated to move forward to impact the rear face of backing member 242 urging both backing member 242 and the sheet of veneer back towards the particular opening. The patting face 246 continues to move, causing the veneer sheet to be properly aligned back within its opening. This position of aligning apparatus 12 is depicted in FIG. 11. The patting face 246 sequences as each veneer sheet is fed into its respective opening. As the last sheet is fed into the top opening and repositioned within its opening, the signal will then be given to the loaded press to close. The $4\frac{1}{2}$ minute drying schedule then commences.

At loading station 6 the feeding apparatus 8 will be pivoted downwardly to begin a new loading cycle and at the same time the operator can move the scissors lift 184 to a higher level so that the top sheet in the stack is at the proper height for the next feeding cycle. The cycle at feeding apparatus 8 is, in part, controlled by the valving 238 and cam mechanism 240 on a timed basis. After the loaded hot press is closed, aligning apparatus 12 will be pivoted rearwardly out of the way to allow indexing of frame 4. This position of aligning apparatus 12 is depicted in FIG. 9. This sequence is repeated as each empty hot press arrives at loading station 6 and as each loaded hot press arrives after the $4\frac{1}{2}$ minute drying time at unloading station 14. During the time of operation and if an exhaust system is employed, such as circular hood 370, the fan or other handling means will be employed to continually draw the air and vapor underneath the hood into conduit 372 and away from the veneer drying system.

In the redrying operation, as depicted in FIGS. 19 and 20, a single hot press 352 is being employed to dry the partially dried veneer. Again, taking an example from the redry schedule, assume that it is southern pine veneer to be redried with a thickness of $\frac{1}{8}$". The drying conditions therefor will be 30 seconds at 340° F. with a continuous applied pressure of 35 psi. Before redrying any southern pine veneer, the press operating conditions would first be set. This is done in the conventional manner. Next the feeding cycle is set and again an approximate 3-second period between indexing of the feeder mechanism provides adequate loading time. The aligning apparatus 362 functions in essentially the same manner as the aligning apparatus within the system of FIGS. 1 and 2 with the exception that it pivots for unloading about a lateral axis on the top of the press 352.

The other major difference is that after the drying time has elapsed, or at any point during the drying time, the tilt cylinders 360 will tilt the press upwardly from feeding apparatus 356 so as to outfeed the redried veneer on the other side of the press. Once the drying time has elapsed, the press will be sequentially opened from top to bottom, allowing each redried sheet to be singulated atop the outfeed conveyor. Before, or simultaneously with the tilting of press 352, cylinder 368 will be actuated to pivot the aligning apparatus 362 upwardly about bearings 364 with respect to press 352 and out of the way of the veneer sheets to be unloaded. After the last sheet has exited from the press, it will be tilted back to a horizontal alignment while the feeding apparatus 356 will be moved downwardly to be in registry with the first opening. Likewise, cylinder 368 will be retracted to bring aligning apparatus 362 back to a position in line with the back edges of the metal plates 354.

Detailed descriptions have been given of several independent and distinct inventions, all of which relate to veneer drying and handling. It will be recognized by those skilled in the art that various modifications can be made to what has been described and it is intended that all of these modifications be included within the broad scope of the apended claims.

What is claimed is:

1. In an apparatus for indexing a large rotatable frame having a substantial portion of its mass mounted on its periphery radially outward of a main bearing, the improvement comprising:

a rotatable base frame surrounding at least a portion of the main bearing;

at least one indexing arm extending radially outwardly from the rotatable base frame to a location substantially adjacent the periphery of the large frame;

means circumferentially spaced about the periphery of the frame, said spacing being predetermined according to the angle through which the indexing arm will travel, for sequentially grasping and releasing the outer end of the indexing arm; and means for sequentially turning the base frame about a vertical axis through a predetermined angle corresponding to preselected distance of travel of a point on the periphery of the large frame.

2. The apparatus of claim 1 in which the turning means includes a pair of offset opposed hydraulic cylinders, each in a substantially horizontal plane and having one end pivotally attached to a base member and the other end pivotally attached to the base frame, with the stroke of each serving to rotate the base frame through the predetermined angle.

3. The apparatus of claim 1 in which the grasping and releasing means includes a plurality of circumferentially spaced latch blocks mounted on the periphery of the large frame and a slidably mounted pawl on the outer end of the indexing arm, said pawl being sequentially slidable into and out of engagement with corresponding latch blocks.

* * * * *